(12) United States Patent
Yenjay

(10) Patent No.: US 6,507,430 B2
(45) Date of Patent: Jan. 14, 2003

(54) LONG WAVELENGTH OPTICAL AMPLIFIER

(75) Inventor: Aydin Yenjay, Phoenixville, PA (US)

(73) Assignee: Photon X, Inc., Malvern, PA (US)

( * ) Notice: Subject to any disclaimer, the term of this patent is extended or adjusted under 35 U.S.C. 154(b) by 0 days.

(21) Appl. No.: 09/888,880

(22) Filed: Jun. 25, 2001

(65) Prior Publication Data

US 2002/0118444 A1 Aug. 29, 2002

Related U.S. Application Data

(60) Provisional application No. 60/271,342, filed on Feb. 23, 2001, and provisional application No. 60/281,167, filed on Apr. 3, 2001.

(51) Int. Cl.[7] .............................. H01S 3/00; H01S 3/915
(52) U.S. Cl. .......................... 359/341.31; 359/341.32; 372/6; 372/70
(58) Field of Search ..................... 359/341.3, 341.31, 359/341.32; 372/6, 70

(56) References Cited

U.S. PATENT DOCUMENTS

| | | | |
|---|---|---|---|
| 4,938,556 A | 7/1990 | Digonnet et al. | |
| 5,050,949 A | 9/1991 | DiGiovanni et al. | |
| 5,119,230 A | 6/1992 | Pfeiffer | |
| 5,268,910 A | * 12/1993 | Huber | 372/6 |
| 5,361,161 A | 11/1994 | Baney et al. | |
| 5,497,265 A | * 3/1996 | Fontana et al. | 359/341 |
| 5,623,362 A | 4/1997 | Mitsuda et al. | |
| 5,623,508 A | * 4/1997 | Grubb et al. | 372/3 |
| 5,673,280 A | * 9/1997 | Grubb et al. | 372/3 |
| 5,712,715 A | 1/1998 | Erdogan et al. | |
| 5,790,300 A | 8/1998 | Zediker et al. | |
| 5,808,786 A | * 9/1998 | Shibuya | 359/341 |
| 5,867,306 A | 2/1999 | Isshiki | |
| 5,917,648 A | 6/1999 | Harker | |
| 5,964,361 A | 10/1999 | Taylor et al. | |
| 6,049,417 A | 4/2000 | Srivastava et al. | |
| 6,049,418 A | 4/2000 | Srivastava et al. | |
| 6,104,528 A | * 8/2000 | Hwang | 359/341 |
| 6,115,174 A | 9/2000 | Grubb et al. | |
| 6,141,142 A | 10/2000 | Espindola et al. | |
| 6,201,637 B1 | 3/2001 | Nilsson et al. | |
| 6,222,670 B1 | 4/2001 | Ryu et al. | |
| 6,233,092 B1 | 5/2001 | Flood et al. | |
| 6,317,254 B1 | 11/2001 | Park et al. | |
| 2002/0003655 A1 | 1/2002 | Park et al. | |

FOREIGN PATENT DOCUMENTS

| | | | |
|---|---|---|---|
| EP | A2-954070 | * | 11/1999 |
| EP | 1073166 A2 | | 1/2001 |
| JP | 11-87822 | * | 3/1999 |

OTHER PUBLICATIONS

Min et al, Opt. Commu. Syst. Lab., vol. 2, pp 1346–1347, 1999, abstract only herewith.*

Mahdi et al., "Low–noise and high–gain L–band EDFA utilising a novel self–generated signal–seeding technique", Optics Communications 195, Aug. 1, 2001, pp. 214–248. Not admitted as prior art.

(List continued on next page.)

Primary Examiner—Nelson Moskowitz
(74) Attorney, Agent, or Firm—Joseph E. Maenner

(57) ABSTRACT

An L band optical amplifier in disclosed. The optical amplifier includes a signal line for transmitting a light signal in a first direction. The signal line has a input, an output disposed optically downstream of the input, and an amplifying gain medium optically disposed between the input and the output. The optical amplifier further includes a laser optically connected to the first amplifying gain medium and an apparatus for directing C band light generated in a second direction, opposite the first direction, into the amplifying gain medium.

13 Claims, 15 Drawing Sheets

OTHER PUBLICATIONS

Shigematsu et al., "A Novel Configuration of L–Band Erbium–Doped Fiber Amplifier for Improved Efficiency", ECOC '99, Sep. 26–30, 1999, Nice, France, pp. I–270–I–271.

Mahdi et al., "Simultaneous Bi–directional of C– and L–Band Erbium Doped Fiber Amplifier", OFC 2000, Mar. 2000, Baltimore, MD, pp. TuA3–2–TuA3–5.

Buxens et al., "Gain Flattened L–band EDFA based on upgraded C–band EDFA using forward ASE pumping in an EDF section", Electronics Letters, vol. 36, No. 9, Apr. 27, 2000, pp. 821–823.

Min et al., "Coupled Structure for Wide–Band EDFA with Gain and Noise Figure Improvements from C to L–Band ASE Injection", IEEE Photonics Technology Letters, vol. 12, No. 5, May 2000, pp. 480–482.

Pratt et al., "Gain Control in L–Band EDFAs by Monitoring Backward Travelling C–Band ASE", IEEE Photonics Technology Letters, vol. 12, No. 8, Aug. 2000, pp. 983–985.

Adikan et al., "A Study of Gain and Noise Figure Performance of an L–Band Erbium Doped Fibre Amplifier (EDFA) with 980 nm and Amplified Spontaneous Emission (ASE) Pumps", TENCON 2000, Intelligent Syst & Technologies for the New Millennium, Kuala Lampur, Malaysia, Sep. 2000, pp. III–417–III–420.

Flood, "Gain Saturation Behavior in L–Band EDFAs", IEEE Photonics Technology Letters, vol. 12, No. 9, Sep. 2000, pp. 1156–1158.

Mahdi et al., "High–Gain Bidirectional $Er^{3+}$–Doped Fiber Amplifier for Conventional–and Long–Wavelength Bands", IEEE Photonics Technology Letters, vol. 12, No. 11, Nov. 2000, pp. 1468–1470.

Mahdi et al., "Long–Wavelength–Band $Er^{3+}$–Doped Fiber Amplifier Incorporating a Ring–Laser as a Seed Signal Generator", IEEE Journal on Selected Topics in Quantum Electronics, vol. 7, No. 1, Jan./Feb. 2001, pp. 59–63.

Mahdi et al., "Effects of signal seeding on long–wavelength– band $Er^{3+}$–doped fiber amplifiers", Optical Engineering, vol. 40, No. 2, Feb. 2001, pp. 186–192.

Adikan et al., "Novel, Gain–Flattened L–Band EDFA with ASE Utilization with >40 nm 3 dB Bandwidth", Microwave and Optical Technology Letters, vol. 28, No. 6, Mar. 20, 2001, pp. 399–402.

Bennett, "Expanding Technologies Boost Available Bandwidth", Laser Focus World—Optoelectronics and Laser Technology Advances, Apr. 13, 2001.

Lee et al., "Enhancement of Power Conversion Efficiency for an L–Band EDFA with a Secondary Pumping Effect in the Unpumped EDF Section", IEEE Photonics Technology Letters, vol. II, No. 1, Jan. 1999, pp. 42–44.

Lee et al., "Passive erbium–doped fiber seed photon generator for high–power $Er^{3+}$–doped fiber fluorescent sources with an 80–nm bandwidth", Optics Letters, vol. 25, No. 5, Mar. 1, 1999, pp. 279–281.

Chung, et al., "Low noise, high efficiency L–band EDFA with 980 nm pumping", Electronics Letters Online, No. 19990750, DO1: 10.1049/el:19990750, Apr. 19, 1999.

* cited by examiner

LONG WAVELENGTH OPTICAL AMPLIFIER

CROSS-REFERENCE TO RELATED APPLICATION

The present application claims the benefit of U.S. Provisional Application No. 60/271,342, filed Feb. 23, 2001 and U.S. Provisional Application No. 60/281,167, filed Apr. 3, 2001.

FIELD OF THE INVENTION

The present invention relates to optical amplifiers having operating wavelengths longer than main emission peak wavelengths, and more particularly to erbium doped fiber and waveguide amplifiers operating in the long wavelength regime (1560–1620 nm), especially for wavelength division multiplexing (WDM) applications.

BACKGROUND OF THE INVENTION

Conventional erbium doped fiber amplifiers (EDFA) have been extensively used in optical telecommunications as means to amplify weak optical signals in the third telecommunication window (near 1550 nm) between telecommunication links. Much work has been done on the design of these amplifiers to provide efficient performance, such as high optical gain and low noise figure. However, with the recent enormous growth of data traffic in telecommunications, owing to the Internet, intranets, and e-commerce, new optical transmission bandwidths are required to provide increased transmission capacity in dense wavelength division multiplexing (DWDM) systems.

There are a few solutions to this demand. One proposed solution is to utilize new materials compositions as a host for the fiber gain medium (instead of silica) such as telluride, which may provide broader amplification bandwidth (up to 80 nm). However, the non-uniform gain shape and poor mechanical properties of telluride glass make these amplifiers difficult to implement in the telecom systems. Also, Raman amplifiers can be considered as an alternative solution to high bandwidth demand, since these amplifiers are capable of providing flexible amplification wavelength with a broad bandwidth. However, these amplifiers place restrictions on optical system architectures because of their required designs for efficient performance, such as long fiber length (>5 km), high pump power (>500 mW) and co-pumping configurations. On the other hand, relatively long erbium doped fibers (EDFs) may also provide amplification in the long wavelength range (1565–1625 nm) when they are used with high power pump sources. This range is commonly called "L band". The conventional range, also known as "C band" is in the wavelength range between 1525–1565 nm.

In principle, L band amplifiers take advantage of the fact that EDFs have a higher e-emission cross-section than absorption cross-section at longer wavelengths. Therefore, for long EDFs, amplified spontaneous emission (ASE) becomes more emphasized at long wavelengths. However, there are still several issues for optimization of L band amplifiers for efficient performance. So far, reported performance of L band EDFAs has been inferior to that of C band EDFAs, with drawbacks as evidenced by higher noise figure (NF) and lower output power and gain. It would be beneficial to provide an L band amplifier with a low noise figure and high output power and gain.

BRIEF SUMMARY OF THE INVENTION

Briefly, the present invention provides an L band optical amplifier. The optical amplifier comprises a signal line for transmitting a signal light in a first direction. The signal line includes an input, an output disposed optically downstream of the input and an amplifying gain medium optically disposed between the input and the output. The optical amplifier further comprises a laser optically connected to the first amplifying gain medium and means for directing C band light generated in a second direction, opposite the first direction, into the amplifying gain medium.

Additionally, the present invention provides a method of amplifying a light signal. The method comprises providing an L band amplifier having a signal line including an input, an output disposed optically downstream of the input and an amplifying gain medium optically disposed between the input and the output. The optical amplifier further includes a laser optically connected to the amplifying gain medium and means for directing C band light into the signal line.

The method further provides providing a light signal into the amplifier input; directing the light signal through the amplifying gain medium; generating a pump signal from the laser into the signal line toward the amplifying gain medium, the pump signal combining with the light signal to produce first amplified light in the amplifying gain medium; generating C band light in the amplifying gain medium, the C band light being directed toward the input; using the means to direct the C band light into the signal line; using the C band light to amplify the light signal in the amplifying gain medium to produce second amplified light; and directing the first and second amplified light toward the output.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
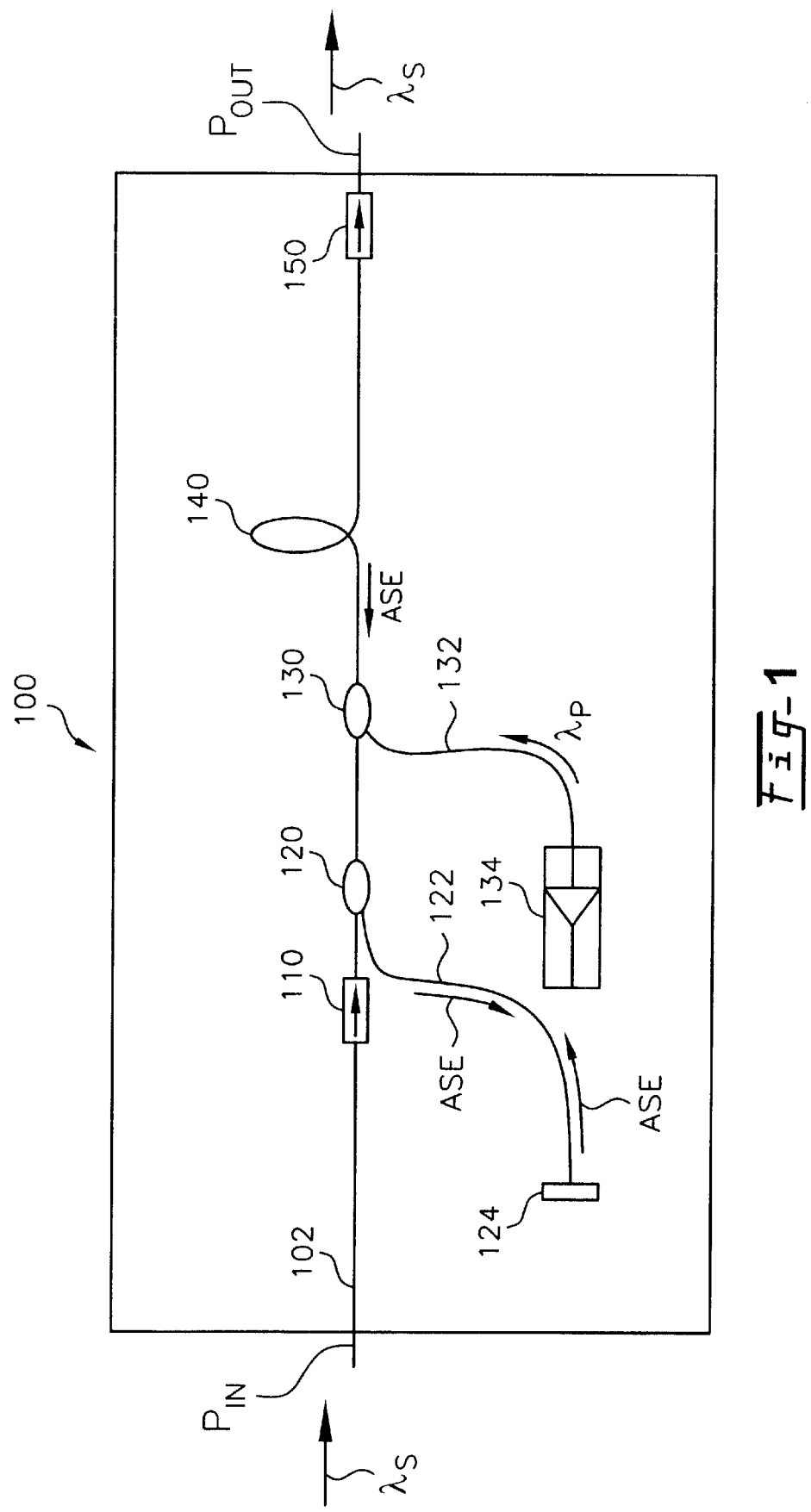
FIG. 1 is a schematic drawing of an L band amplifier according to a first embodiment of the present invention.

In the drawings, like numerals indicate like elements throughout. The present invention provides novel techniques and arrangements for improving the performance of L band EDFAs. In general, the present invention utilizes ASE in the C band to provide additional amplification capability in the amplifier. The ASE is generated during signal amplification by a conventional pump laser as a supplemental pump source for L band amplification or by a separate C band seed pump.

FIG. 1 shows a schematic drawing of an L band amplifier 100 according to a first embodiment of the present invention. The amplifier 100 includes a signal line 102 which extends from an input $P_{in}$ one end of the amplifier 100 to an output $P_{out}$ at another end of the amplifier 100. Preferably, the signal line 102 is constructed from a polymer, and more preferably, from a perfluoropolymer, although those skilled in the art will recognize that the signal line 102 can be a glass or other light transmitting medium, including a waveguide. The input $P_{in}$ and the output $P_{out}$ are optically connected to each other along the signal line 102 through the amplifier 100. Components are defined to be "optically connected" when light signals can be transmitted between those components. Signal light $\lambda_S$ having at least one, and preferably, multiple wavelengths is transmitted through the amplifier 100 from the input $P_{in}$ to the output $P_{out}$, from left to right as shown in FIG. 1. The wavelengths of the signal light $\lambda_S$ preferably range approximately from 1565 to 1625 nanometers, placing the signal light $\lambda_S$ in the L band. Those skilled in the art will recognize that the signal line 102 can be a fiber, a waveguide, or other light transmitting device.

A first optical isolator 110 is optically disposed in the signal line 102 between the input $P_{in}$ and the output $P_{out}$. The first optical isolator 110 prevents backscattered light and other optical noise from traveling backward along the signal line 102, from the first optical isolator 110 toward the input $P_{in}$. A C-L band multiplexer 120 is disposed along the signal line 102 optically downstream of the first optical isolator 110. As used herein, the term "optically downstream" is defined to mean a direction along the signal line 102 from the input $P_{in}$ toward the output $P_{out}$. The C-L band multiplexer 120 couples a first end of an ASE guide 122 to the signal line 102. A second end of the ASE guide 122 is preferably connected to a mirror 124. Preferably, the mirror 124 is made by gold deposition to maximize reflection, although those skilled in the art will recognize that other types of mirrors can be used. Alternatively, instead of using the mirror 124, the second end of the ASE guide 122 can be polished to provide Fresnel reflection. Use of a gold mirror provides approximately 90% reflection of incident light back into the ASE guide 122, while a polished guide end provides only approximately 4% reflection back into the ASE guide 122. Those skilled in the art will recognize that the ASE guide 122 can be a fiber, a waveguide, or other light transmitting device.

A pump-signal multiplexer 130 is disposed along the signal line 102 optically downstream of the C-L band multiplexer 120. The pump-signal multiplexer 130 couples a pump laser 134 to the signal line 102 via a pigtail 132. Preferably, the pump laser 134 is a 980 nanometer laser which emits a pump signal $\lambda_P$, although those skilled in the art will recognize that other wavelengths can be used as well. Also preferably, the pump laser 134 has an output power of at least 100 mW, although those skilled in the art will recognize that the pump laser 124 can have other output powers as well. Although a laser 134 is preferred to optically connect via the pigtail 132 to the pump-signal multiplexer 130, those skilled in the art will recognize that other optical connection techniques, such as free space coupling, can be used instead.

A rare earth doped amplifying gain medium 140 is disposed along the signal line 102 optically downstream of the pump-signal multiplexer 130. Preferably, the rare earth is erbium, although those skilled in the art will recognize that other elements, including, but not limited to lanthanum, cerium, praseodymium, neodymium, promethium, samarium, europium, gadolinium, terbium, dysprosium, holmium, thulium, ytterbium, lutetium, and combinations and blends thereof can be used. Although the amplifying gain medium 140 does not have a minimum or maximum length, those skilled in the art will recognize that the length of the amplifying gain medium 140 can be varied, in conjunction with different output powers of the pump laser 134, to provide different amplification gains and/or output powers. While the amplifying gain medium 140 is preferably a fiber, those skilled in the art will recognize that the amplifying gain medium 140 can also be a waveguide or other light transmitting device.

A second optical isolator 150 is disposed along the signal line 102 optically downstream of the amplifying gain medium 140. The second optical isolator 150 prevents backscattered light and other optical noise from traveling backward along the signal line 102, from the second optical isolator 150 toward the amplifying gain medium 140. The second optical isolator 150 is optically connected to the output $P_{out}$ of the amplifier 100.

The devices described above, including the optical isolators 110, 150, the multiplexers 120, 130, amplifying gain medium 140, and the pump laser 134, can also be used in amplifying C band signals.

In operation, the signal light $\lambda_S$ having a wavelength band of approximately between 1565 and 1625 nanometers is inserted into the amplifier 100 in a first direction at the input $P_{in}$. The signal light $\lambda_S$ is transmitted along the signal line 102 to the first optical isolator 110. The signal light $\lambda_S$ passes through the first optical isolator 110 and along the signal line 102 to the C-L band multiplexer 120. The signal light $\lambda_S$ then passes through the C-L band multiplexer 120 to the pump-signal multiplexer 130.

The pump laser 134 transmits a 980 nanometer pump signal $\lambda_P$ along the pump laser guide 132 to the pump-signal multiplexer 130. At the pump-signal multiplexer 130, the signal light $\lambda_S$ is combined with the pump signal $\lambda_P$ emitted by the pump laser 134. The combined signal light $\lambda_S$ and the pump signal $\lambda_P$ are transmitted to the amplifying gain medium 140. The pump signal $\lambda_P$ excites the rare earth element in the amplifying gain medium 140, amplifying the signal light $\lambda_S$, as is well known in the art. The amplified signal light $\lambda_S$ is then transmitted from the amplifying gain medium 140, through the second optical isolator 150, and to the output $P_{out}$.

However, as the signal light $\lambda^s$ is transmitted through the amplifying gain medium 140, ASE, which travels in both forward and backward directions relative to the signal light $\lambda_s$, is generated. Backward ASE light for an L band signal is generated in the C band, with wavelengths of approximately between 1525 and 1565 nanometers. The backward ASE travels in a second, opposite direction from the signal light $\lambda_s$, toward the input $P_{in}$. The ASE travels through the pump-signal multiplexer 130 to the C-L band multiplexer 120. At the C-L band multiplexer 120, any L band light is directed along the signal line 102 to the first optical isolator 110, which blocks further transmission of the L band light toward the input $P_{in}$, while C band light in the form of the ASE is directed along the ASE guide 122. The ASE travels through the ASE guide 122 to the mirror 124, where the ASE is reflected back through the ASE guide 122. The ASE combines with the signal light $\lambda_S$ at the C-L band multiplexer 120 and is transmitted toward the pump-signal multiplexer 130. At the pump-signal multiplexer 130, the ASE and the light signal $\lambda_S$ combine with the pump signal $\lambda_p$. Since the ASE is in the C band range, the ASE acts as a supplemental pump source, increasing the amplification capacity of the amplifier 100 in the L band range. The ASE has sufficient energy and proper wavelengths to pump the signal light $\lambda_S$ in manner similar to the pump laser 134. After amplification by the pump laser 134 and by the reflected ASE, the signal light $\lambda_S$ has an amplified intensity, larger than the initial intensity.

Figure 2:
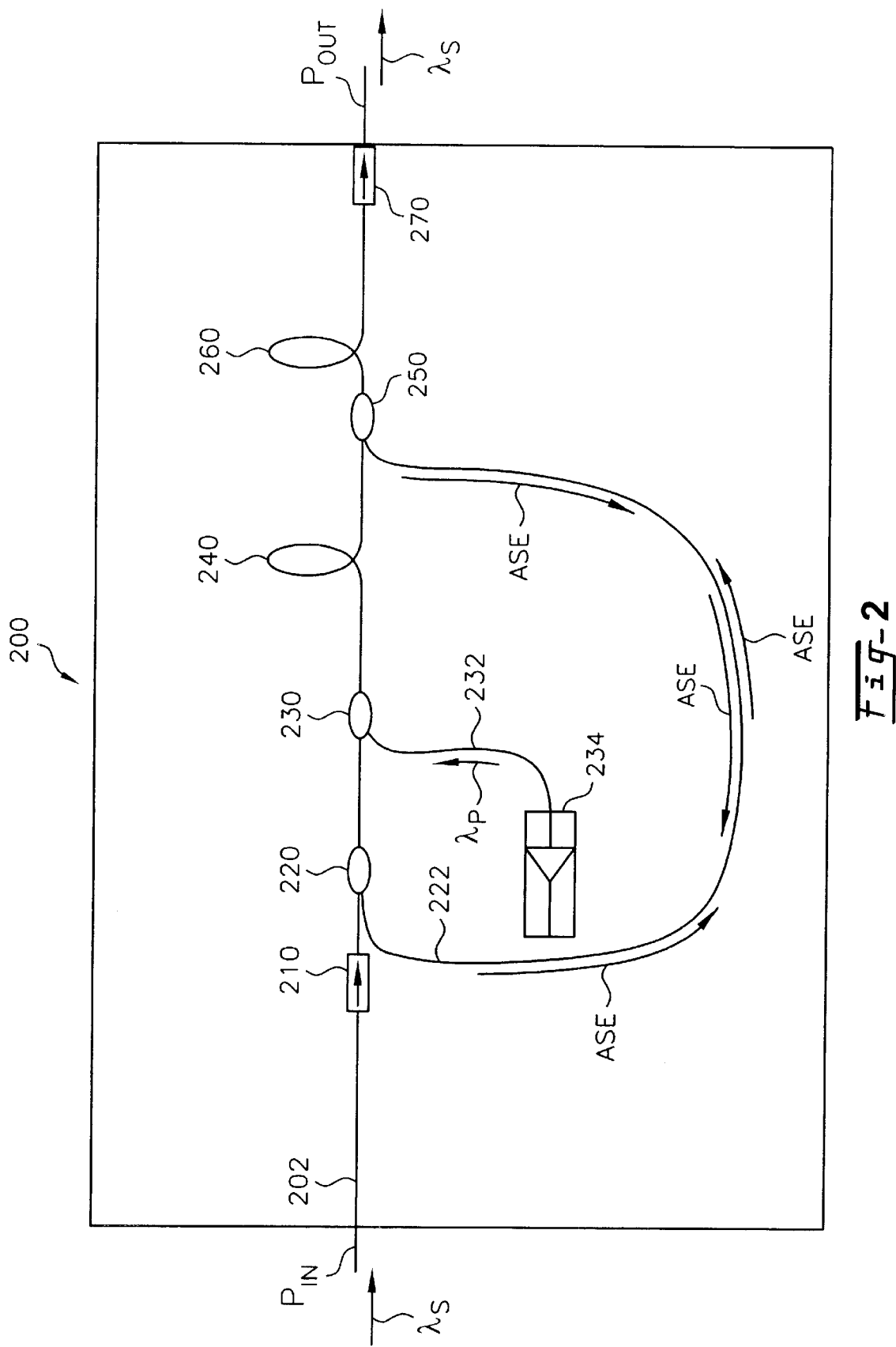
FIG. 2 is a schematic drawing of an L band amplifier according to a second embodiment of the present invention.

A second embodiment of an L band amplifier 200 according to the present invention is shown schematically in FIG. 2. The amplifier 200 includes a signal line 202 which extends from an input $P_{in}$ at one end of the amplifier 200 to an output $P_{out}$ at another end of the amplifier 200. The input $P_{in}$ and the output $P_{out}$ are optically connected to each other along the signal line 202 through the amplifier 200. Signal light $\lambda_S$ having at least one, and preferably, multiple wavelengths is transmitted through the amplifier 200 from the input $P_{in}$ to the output $P_{out}$, from left to right as shown in FIG. 2. The wavelengths of the signal light As preferably range approximately from 1565 to 1625 nanometers, placing the signal light $\lambda_S$ in the L band.

A first optical isolator 210 is optically disposed in the signal line 202 between the input $P_{in}$ and the output $P_{out}$. The first optical isolator 210 prevents backscattered light and other optical noise from traveling backward along the signal line 202, from the first optical isolator 210 toward the input $Pi_{in}$. A first C-L band multiplexer 220 is disposed along the signal line 202 optically downstream of the first optical isolator 210. The first C-L band multiplexer 220 couples a first end of an ASE guide 222 to the signal line 202. A second end of the ASE guide 222 is preferably connected to a second C-L band multiplexer 250 which is disposed along the signal line 202 optically downstream of the first C-L band multiplexer 220.

A pump-signal multiplexer 230 is disposed along the signal line 202 optically downstream of the first C-L band multiplexer 220. The pump-signal multiplexer 230 couples a first end of a pump laser guide 232 to the signal line 202. A second end of the pump laser guide 232 is connected to a pump laser 234. Preferably, the pump laser 234 is a 980 nanometer laser which emits a pump signal $\lambda_p$, although those skilled in the art will recognize that other wavelengths can be used as well. Also preferably, the pump laser 234 has an output power of at least 100 mW, although those skilled in the art will recognize that the pump laser 234 can have other output powers as well.

A rare earth doped amplifying gain medium includes a first amplifying gain portion 240 and a second amplifying gain portion 260. The first amplifying gain portion 240 is disposed along the signal line 202 optically downstream of the pump-signal multiplexer 230. The second amplifying gain portion 260 is disposed along the signal line 202 optically downstream of the first amplifying gain portion 240. Although the amplifying gain portions 240, 260 do not have a minimum or maximum length, those skilled in the art will recognize that the lengths of the amplifying gain portions 240, 260 can be varied, in conjunction with different output powers of the pump laser 234, to provide different amplification gains and/or output powers.

The second C-L band multiplexer 250 is disposed along the signal line 202 optically between the first and second amplifying gain portions 240, 260. A second optical isolator 270 is disposed along the signal line 202 optically downstream of the second amplifying gain portion 260. The second optical isolator 270 prevents backscattered light and other optical noise from traveling backward along the signal line 202, from the second optical isolator 270 toward the second amplifying gain portion 260. The second optical isolator 270 is optically connected to the output $P_{out}$ of the amplifier 200.

In operation, the signal light $\lambda_S$ having a wavelength band of approximately between 1565 and 1625 nanometers is injected into the amplifier 200 in a first direction at the input $P_{in}$. The signal light $\lambda_S$ is transmitted along the signal line 202 to the first optical isolator 210. The signal light $\lambda_S$ passes through the first optical isolator 210 and along the signal line 202 to the first C-L band multiplexer 220. The signal light $\lambda_S$ passes through the first C-L band multiplexer 220 to the pump-signal multiplexer 230.

The pump laser 234 transmits a 980 nanometer pump signal $\lambda_P$ along the pump laser guide 232 to the pump-signal multiplexer 230. At the pump-signal multiplexer 230, the signal light $\lambda_S$ is combined with the pump signal $\lambda_p$ emitted by the pump laser 234. The combined signal light $\lambda_S$ and the pump signal $\lambda_P$ are transmitted to the first amplifying gain portion 240. The pump signal $\lambda_P$ excites the rare earth element in the first amplifying gain portion 240, amplifying the signal light $\lambda_S$.

However, as the signal light $\lambda_S$ is transmitted through the first amplifying gain portion 240, first ASE, which travels in both forward and backward directions relative to the signal light $\lambda_s$, is generated. Only backward ASE will be discussed. The first ASE travels in a second, opposite direction from the signal light $\lambda_s$, toward the input $P_{in}$. The first ASE travels through the pump-signal multiplexer 230 and to the first C-L band multiplexer 220. At the first C-L band multiplexer 220, any L band light is directed along the signal line 202 to the first optical isolator 210, which blocks further transmission of the L band light toward the input $P_{in}$, while C band light in the form of the ASE is directed along the ASE guide 222.

The signal light $\lambda_s$, now amplified by the first amplifying gain portion 240, is transmitted to the second C-L band multiplexer 250, where the signal light $\lambda_S$ is combined with the first ASE for transmission to the second amplifying gain portion 260. Residual pump signal $\lambda_P$ is combined with the first ASE to excite the rare earth element in the second amplifying gain portion 260, further amplifying the signal light $\lambda_S$. The amplified signal light $\lambda_S$ is then transmitted from the second amplifying gain portion 260, through the second optical isolator 270, and to the output $P_{out}$ However, as the signal light $\lambda_S$ is transmitted through the second amplifying gain portion 260, second ASE, which travels in both forward and backward directions relative to the signal light $\lambda_s$, is generated. Again, only backward ASE will be discussed. The second ASE travels in the second, opposite direction from the signal light $\lambda_s$, toward the second C-L band multiplexer 250. The second ASE travels toward the second C-L band multiplexer 250 and to the first C-L band multiplexer 220. At the second C-L band multiplexer 250, any L band light is directed along the signal line 202 to the first optical isolator 210, which blocks further transmission of the L band light toward the input $P_{in}$, while C band light in the form of the ASE is directed along the ASE guide 222.

Figure 3:
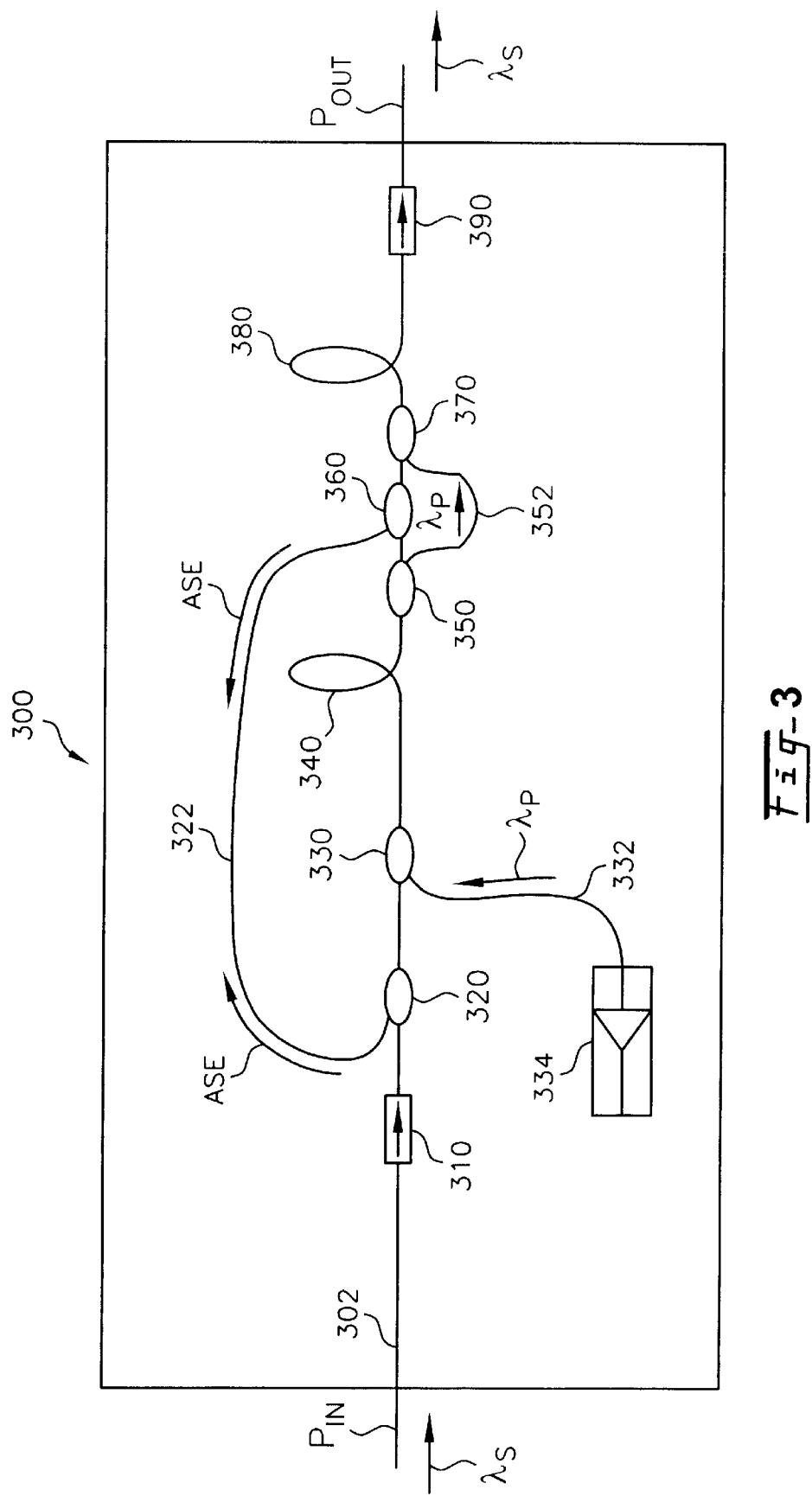
FIG. 3 is a schematic drawing of an L band amplifier according to a third embodiment of the present invention.

A third embodiment of an L band amplifier 300 according to the present invention is shown schematically in FIG. 3. The amplifier 300 includes a signal line 302 which extends from an input $P_{in}$ at one end of the amplifier 300 to an output $P_{out}$ at another end of the amplifier 300. The input $P_{in}$ and the output $P_{out}$ are optically connected to each other along the signal line 302 through the amplifier 300. Signal light $\lambda_S$ having at least one, and preferably, multiple wavelengths is transmitted through the amplifier 300 from the input $P_{in}$ to the output $P_{out}$, from left to right as shown in FIG. 3. The wavelengths of the signal light $\lambda_S$ preferably range approximately from 1565 to 1625 nanometers, placing the signal light $\lambda_S$ in the L band.

A first optical isolator 310 is optically disposed in the signal line 302 between the input $P_{in}$ and the output $P_{out}$. The first optical isolator 310 prevents backscattered light and other optical noise from traveling backward along the signal line 302, from the first optical isolator 310 toward the input $P_{in}$. A first C-L band multiplexer 320 is disposed along the signal line 302 optically downstream of the first optical isolator 310. The first C-L band multiplexer 320 couples a first end of an ASE guide 322 to the signal line 302. A second end of the ASE guide 322 is preferably connected to a second C-L band multiplexer 360 which is disposed along the signal line 302 optically downstream of the first C-L band multiplexer 320.

A pump-signal multiplexer 330 is disposed along the signal line 302 optically downstream of the first C-L band multiplexer 320. The pump-signal multiplexer 330 couples a first end of a pump laser guide 332 to the signal line 302. A second end of the pump laser guide 332 is connected to a pump laser 334. Preferably, the pump laser 334 is a 980 nanometer laser which emits a pump signal $\lambda_p$, although those skilled in the art will recognize that other wavelengths can be used as well. Also preferably, the pump laser 334 has an output power of at least 100 mW, although those skilled in the art will recognize that the pump laser 334 can have other output powers as well.

A rare earth doped amplifying gain medium includes a first amplifying gain portion 340 and a second amplifying gain portion 380. The first amplifying gain portion 340 is disposed along the signal line 302 optically downstream of the pump-signal multiplexer 330. A first 980–1580 nm multiplexer 350 is disposed along the signal line 302 optically downstream of the first amplifying gain portion 340. A second 980–1580 nm multiplexer 370 is disposed along the signal line 302 optically downstream of the first 980–1580 nm multiplexer 350. A bypass guide 352 optically connects the first and second 980–1580 nm multiplexers 350, 370. The second C-L band multiplexer 360 is optically disposed along the signal line 302 between the first 980–1580 nm multiplexer 350 and the second 980–1580 nm multiplexer 370, such that the bypass guide 352 optically directs the 980 nm pump light around the second C-L band multiplexer 360 via 980 nm ports of the 980–1580 nm multiplexers 350, 370.

The second rare earth doped amplifying gain portion 380 is disposed along the signal line 302 optically downstream of the second 980–1580 nm multiplexer 370. Although the amplifying gain portions 340, 380 do not have a minimum or maximum length, those skilled in the art will recognize that the lengths of the amplifying gain portions 340, 380 can be varied, in conjunction with different output powers of the pump laser 334, to provide different amplification gains and/or output powers.

A second optical isolator 390 is disposed along the signal line 302 optically downstream of the second amplifying gain portion 380. The second optical isolator 390 prevents backscattered light and other optical noise from traveling backward along the signal line 302, from the second optical isolator 390 toward the second amplifying gain portion 380. The second optical isolator 390 is optically connected to the output $P_{out}$ of the amplifier 300.

In operation, the signal light $\lambda_S$ having a wavelength band of approximately between 1565 and 1625 nanometers is injected into the amplifier 300 in a first direction at the input $P_{in}$. The signal light $\lambda_S$ is transmitted along the signal line 302 to the first optical isolator 310. The signal light $\lambda_S$ passes through the first optical isolator 310 and along the signal line 302 to the first C-L band multiplexer 320. The signal light $\lambda_S$ passes through the first C-L band multiplexer 320 to the pump-signal multiplexer 330.

The pump laser 334 transmits a 980 nanometer pump signal $\lambda_P$ along the pump laser guide 332 to the pump-signal multiplexer 330. At the pump-signal multiplexer 330, the signal light $\lambda_S$ is combined with the pump signal $\lambda_P$ emitted by the pump laser 334. The combined signal light $\lambda_S$ and the pump signal $\lambda_P$ are transmitted to the first amplifying gain portion 340. The pump signal $\lambda_P$ excites the rare earth element in the first amplifying gain portion 340, amplifying the signal light $\lambda_S$. However, as the signal light $\lambda_S$ is transmitted through the first amplifying gain portion 340, first ASE is generated. The first ASE travels in a second, opposite direction from the signal light $\lambda_s$, toward the input $P_{in}$.

The first ASE travels through the pump-signal multiplexer 330 and to the first C-L band multiplexer 320. At the first C-L band multiplexer 320, any L band light is directed along the signal line 302 to the first optical isolator 310, which blocks further transmission of the L band light toward the input $P_{in}$, while C band light in the form of the first ASE is directed along the ASE guide 322 to the second C-L band multiplexer 360. The first ASE is then transmitted to the second 980–1580 nm multiplexer 370. The signal light $\lambda_s$, now amplified by the first amplifying gain portion 340, is transmitted through the first 980–1580 nm multiplexer 350 to the second C-L band multiplexer 360, where the signal light $\lambda_S$ is combined with the first ASE for transmission through the second 980–1580 nm multiplexer 370 to the second amplifying gain portion 380.

Pump light $\lambda_P$ which exits the first amplifying gain portion 340 is diverted by the first 980–1580 nm multiplexer 350 to the bypass guide 352. The pump light $\lambda_P$ is transmitted through the bypass guide 352 to the second 980–1580 nm multiplexer 370, where the pump light $\lambda_P$ is recombined with the signal light $\lambda_S$. The bypass guide 352 is installed between the first and second amplifying gain portions 340, 380 to eliminate any high insertion loss which may occur if the pump light $\lambda_P$ is directed through the second C-L band multiplexer 360 while allowing the first ASE to recycle into the second amplifying gain portion 380.

The combined pump light $\lambda_P$ and signal light $\lambda_s$, as well as the first ASE, are then transmitted to the second amplifying gain portion 380. The pump signal $\lambda_P$ and the first ASE excite the rare earth element in the second amplifying gain portion 380, further amplifying the signal light $\lambda_S$. The signal light $\lambda_S$ that has been amplified in the second amplifying gain portion 380 is then transmitted along the signal line 302 to the second optical isolator 390 and to the output $P_{out}$.

However, as the signal light $\lambda_S$ is transmitted through the second amplifying gain portion 380, second ASE, which travels in both forward and backward directions relative to the signal light $\lambda_s$, is generated. Only the backward ASE will be discussed. The second ASE travels in the second, opposite direction from the signal light $\lambda_s$, toward the input $P_{in}$. The second ASE is diverted by the second C-L band multiplexer 360, along the ASE guide 322 to the first C-L band multiplexer 320. The second ASE is combined with the pump light $\lambda_P$ at the pump-signal multiplexer 330. The second ASE enhances the pumping of the signal light $\lambda_S$ in the first amplifying gain portion 340.

Figure 4:
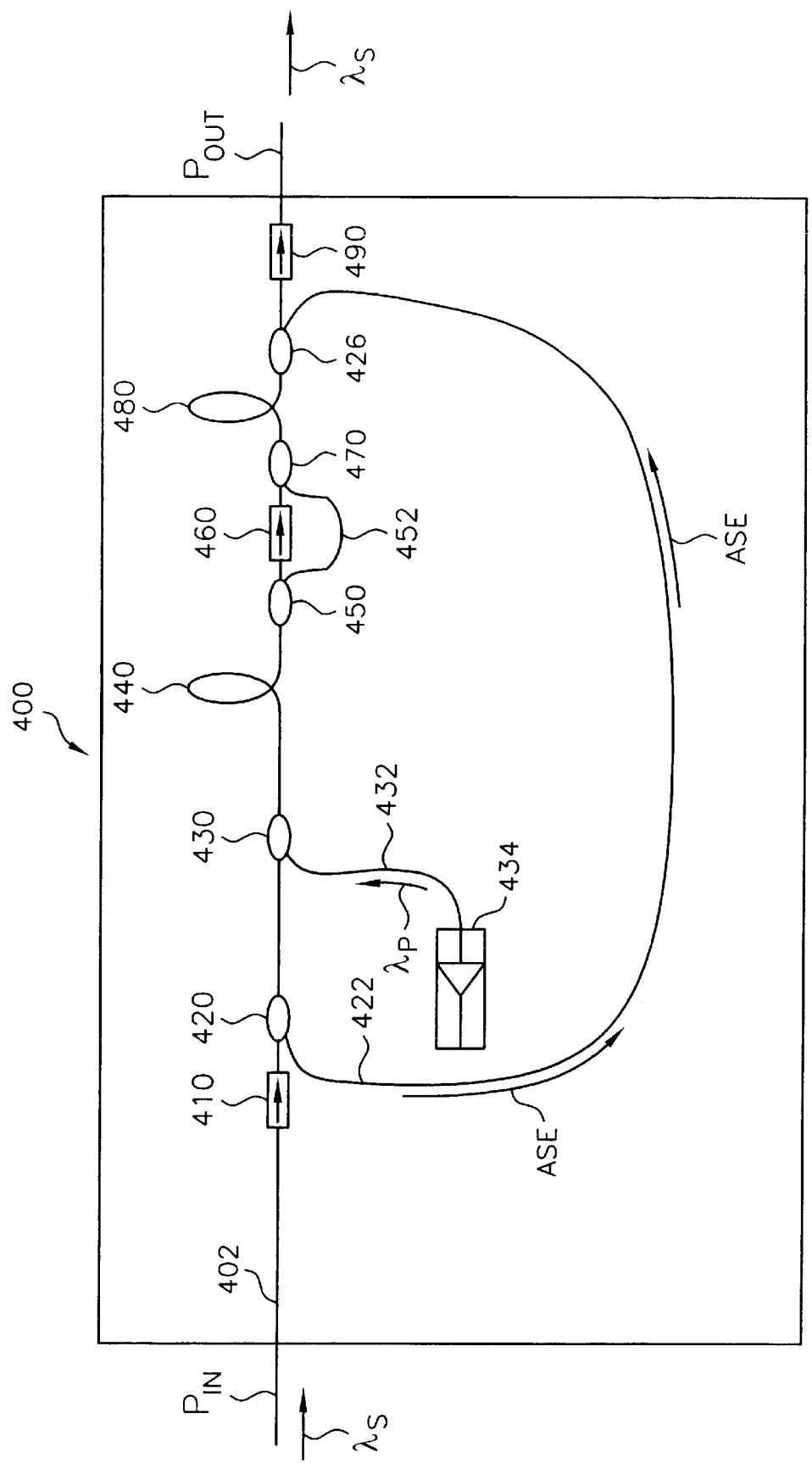
FIG. 4 is a schematic drawing of an L band amplifier according to a fourth embodiment of the present invention.

A fourth embodiment of an L band amplifier 400 according to the present invention is shown schematically in FIG. 4. The amplifier 400 includes a signal line 402 which extends from an input $P_{in}$ at one end of the amplifier 400 to an output $P_{out}$ at another end of the amplifier 400. The input $P_{in}$ and the output $P_{out}$ are optically connected to each other along the signal line 402 through the amplifier 400. Signal light $\lambda_S$ having at least one, and preferably, multiple wavelengths is transmitted through the amplifier 400 from the input $P_{in}$ to the output $P_{out}$, from left to right as shown in FIG. 4. The wavelengths of the signal light $\lambda_S$ preferably range approximately from 1565 to 1625 nanometers, placing the signal light $\lambda_S$ in the L band.

A first optical isolator 410 is optically disposed in the signal line 402 between the input $P_{in}$ and the output $P_{out}$. The first optical isolator 410 prevents backscattered light and other optical noise from traveling backward along the signal line 402, from the first optical isolator 410 toward the input $P_{in}$. A first C-L band multiplexer 420 is disposed along the signal line 402 optically downstream of the first optical isolator 410. The first C-L band multiplexer 420 couples a first end of an ASE guide 422 to the signal line 402. A second end of the ASE guide 422 is preferably connected to a second C-L band multiplexer 426 which is disposed along the signal line 402 optically downstream of the first C-L band multiplexer 420.

A pump-signal multiplexer 430 is disposed along the signal line 402 optically downstream of the first C-L band multiplexer 420. The pump-signal multiplexer 430 couples a first end of a pump laser guide 432 to the signal line 402. A second end of the pump laser guide 432 is connected to a pump laser 434. Preferably, the pump laser 434 is a 980 nanometer laser which emits a pump signal $\lambda_P$, although those skilled in the art will recognize that other wavelengths can be used as well. Also preferably, the pump laser 434 has an output power of at least 100 mW, although those skilled in the art will recognize that the pump laser 434 can have other output powers as well.

A rare earth doped amplifying gain medium includes a first amplifying gain portion 440 and a second amplifying gain portion 480. The first amplifying gain portion 440 is disposed along the signal line 402 optically downstream of the pump-signal multiplexer 430. A first 980–1580 nm multiplexer 450 is disposed along the signal line 402 optically downstream of the first amplifying gain portion 440. A second 980–1580 nm multiplexer 470 is disposed along the signal line 402 optically downstream of the first 980–1580 nm multiplexer 450. A bypass guide 452 optically connects the first and second 980–1580 nm multiplexers 450, 470. A second optical isolator 460 is optically disposed along the signal line 402 between the first 980–1580 nm multiplexer 450 and the second 980–1580 nm multiplexer 470, such that the bypass guide 452 optically bypasses the second optical isolator 460.

The second amplifying gain portion 480 is disposed along the signal line 402 optically downstream of the second 980–1580 nm multiplexer 470. Although the amplifying gain portions 440, 480 do not have a minimum or maximum length, those skilled in the art will recognize that the lengths of the amplifying gain portions 440, 480 can be varied, in conjunction with different output powers of the pump laser 434, to provide different amplification gains and/or output powers.

A third optical isolator 490 is disposed along the signal line 402 optically downstream of the second C-L band multiplexer 426. The third optical isolator 490 prevents backscattered light and other optical noise from traveling backward along the signal line 402, from the third optical isolator 490 toward the second amplifying gain portion 480. The second C-L band multiplexer 426 is optically disposed between the second amplifying gain portion 480 and the third optical isolator 490. The third optical isolator 490 is optically connected to the output $P_{out}$ of the amplifier 400.

In operation, the signal light $\lambda_S$ having a wavelength band of approximately between 1565 and 1625 nanometers is injected into the amplifier 400 in a first direction at the input $P_{in}$. The signal light $\lambda_S$ is transmitted along the signal line 402 to the first optical isolator 410. The signal light $\lambda_S$ passes through the first optical isolator 410 and along the signal line 402 to the first C-L band multiplexer 420. The signal light $\lambda_S$ passes through the first C-L band multiplexer 420 to the pump-signal multiplexer 430.

The pump laser 434 transmits a 980 nanometer pump signal $\lambda_P$ along the pump laser guide 432 to the pump-signal multiplexer 430. At the pump-signal multiplexer 430, the signal light $\lambda_S$ is combined with the pump signal $\lambda_P$ emitted by the pump laser 434. The combined signal light $\lambda_S$ and the pump signal $\lambda_P$ are transmitted to the first amplifying gain portion 440. The pump signal $\lambda_P$ excites the rare earth element in the first amplifying gain portion 440, amplifying the signal light $\lambda_S$.

However, as the signal light $\lambda_S$ is transmitted through the first amplifying gain portion 440, first ASE, which travels in both forward and backward directions relative to the signal light $\lambda_S$, is generated. Only backward ASE will be discussed. The first ASE travels in a second, opposite direction from the signal light $\lambda_S$, toward the input $P_{in}$. The first ASE travels through the pump-signal multiplexer 430 and to the first C-L band multiplexer 420. At the first C-L band multiplexer 420, any L band light is directed along the signal line 402 to the first optical isolator 410, which blocks further transmission of the L band light toward the input $P_{in}$, while C band light in the form of first ASE is directed along the ASE guide 422 to the second C-L band multiplexer 426.

The signal light $\lambda_S$, now amplified by the first amplifying gain portion 440, is transmitted through the first 980–1580 nm multiplexer 450, the second optical isolator 460, and the second 980–1580 nm multiplexer 470. Pump light $\lambda_P$ which exits the first amplifying gain portion 440 is diverted by the first 980–1580 nm multiplexer 450 to the bypass guide 452. The pump light $\lambda_P$ is transmitted through the bypass guide 452 to the second 980–1580 nm multiplexer 470, where the pump light $\lambda_P$ is recombined with the signal light $\lambda_S$. The bypass guide 452 is installed between the first and second amplifying gain portions 440, 480 to eliminate any high insertion loss which may occur if the pump light $\lambda_P$ is directed through the second optical isolator 460.

The combined pump light $\lambda_P$ and signal light $\lambda_S$ are then transmitted to the second amplifying gain portion 480. The pump signal $\lambda_P$ excites the rare earth element in the second amplifying gain portion 480, further amplifying the signal light $\lambda_S$. The first ASE travels from the second C-L band multiplexer 426 through the second amplifying gain portion 480, where the first ASE acts to counter-pump the signal light $\lambda_S$ to provide additional amplification of the signal light $\lambda_S$. As a further benefit, the counter-pumping of the second amplifying gain portion 480 eliminates residual pump signal $\lambda_P$ at the output $P_{out}$. The signal light $\lambda_S$ that has been amplified in the second amplifying gain portion 480 is then transmitted along the signal line 402 to the third optical isolator 490 and to the output $P_{out}$.

However, as the signal light $\lambda_S$ is transmitted through the second amplifying gain portion 480, second ASE, which travels in both forward and backward directions relative to the signal light $\lambda_S$, is generated. Only backward ASE will be discussed. The second ASE travels in the second, opposite direction from the signal light $\lambda_S$, toward the input $P_{in}$. The second ASE, as well as any residual first ASE which is transmitted from the second amplifying gain portion 480 toward the input $P_{in}$, is absorbed by the second optical isolator 460 to prevent the possibility of lasing. After amplification by the pump laser 434 and by the ASE, the signal light $\lambda_S$ has an amplified intensity, larger than the initial intensity.

Figure 5:
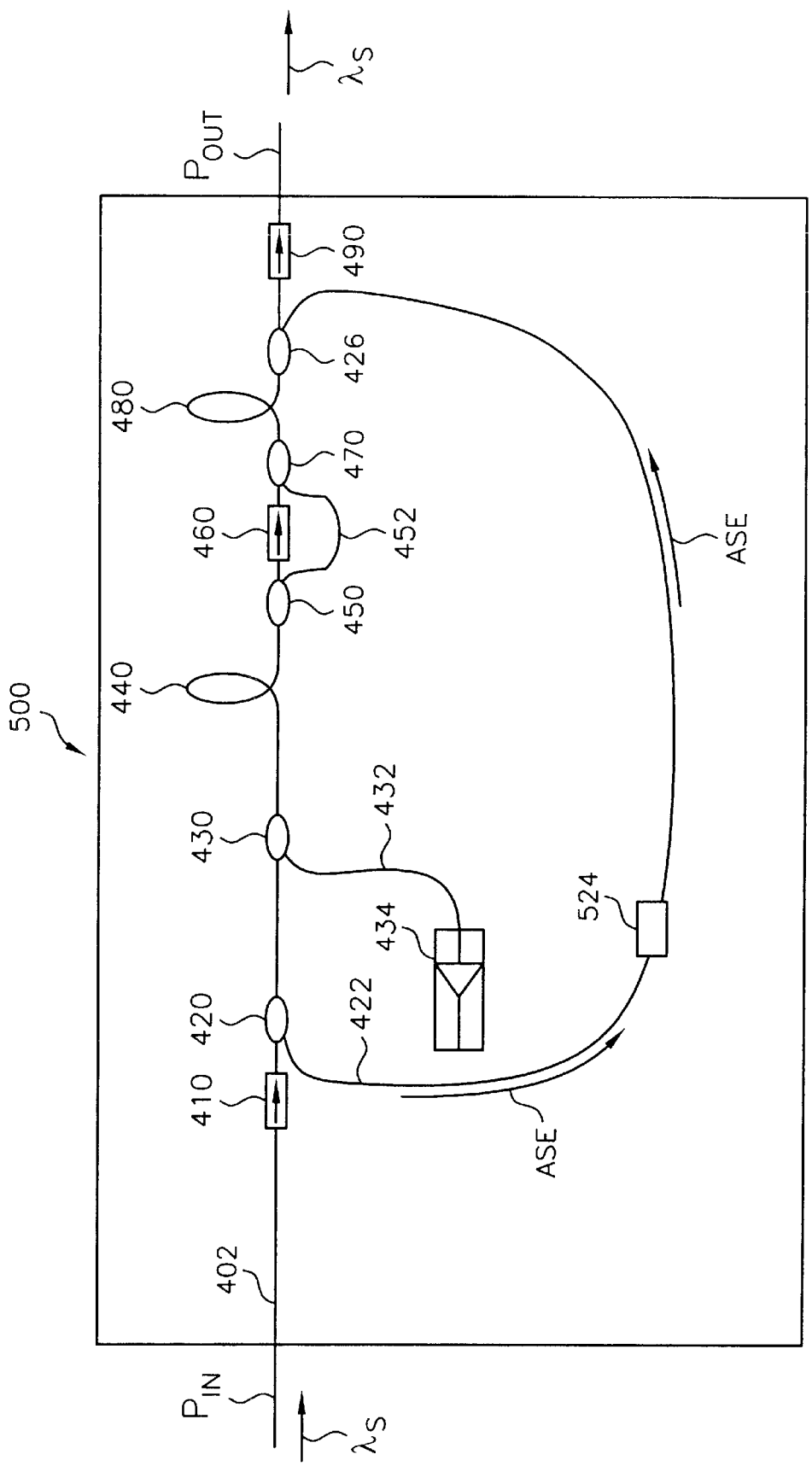
FIG. 5 is a schematic drawing of an L band amplifier according to a fifth embodiment of the present invention.

A fifth embodiment of an amplifier 500 according to the present invention is shown in FIG. 5. The amplifier 500 is similar to the amplifier 400, with the exception that, in the amplifier 500, a filter 524 is optically disposed along the ASE guide 422 between the first and second C-L band multiplexers 420, 426. Preferably, the filter 524 is a Bragg grating, a flat connector, or other optical filter known in the art. The filter 524 reflects a small portion (approximately 4%) of the first ASE and allows the remainder (approximately 96%) to be transmitted to the second C-L band multiplexer 426 as described above. The reflected ASE enters the signal line 402 at the first C-L band multiplexer 420 and is transmitted along the signal line 402 to the first amplifying gain portion 440, where the reflected ASE provides additional pumping power to the signal light $\lambda_S$ in the first amplifying gain portion 440. Further operation of the amplifier 500 is as described above with reference to the amplifier 400. After amplification by the pump laser 434 and by the ASE, the signal light $\lambda_S$ has an amplified intensity, larger than the initial intensity.

Figure 6A:
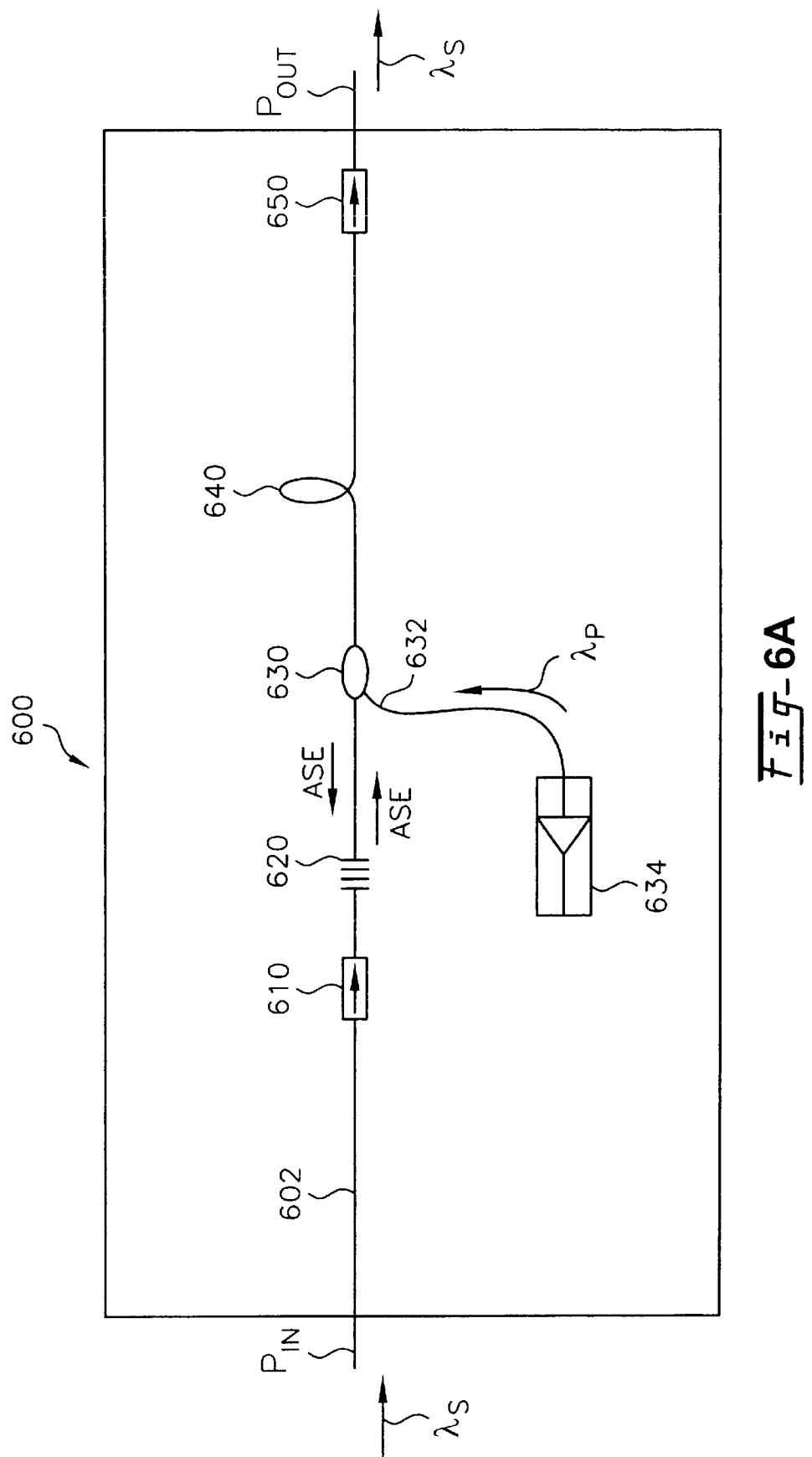
FIG. 6A is a schematic drawing of an L band amplifier according to a first version of a sixth embodiment of the present invention.

A first version of a sixth embodiment of an L band amplifier 600 according to the present invention is shown schematically in FIG. 6A. The amplifier 600 includes a signal line 602 which extends from an input $P_{in}$ at one end of the amplifier 600 to an output $P_{out}$ at another end of the amplifier 600. The input $P_{in}$ and the output $P_{out}$ are optically connected to each other along the signal line 602 through the amplifier 600. Signal light $\lambda_S$ having at least one, and preferably, multiple wavelengths is transmitted through the amplifier 600 from the input $P_{in}$ to the output $P_{out}$, from left to right as shown in FIG. 6A. The wavelengths of the signal light $\lambda_S$ preferably range approximately from 1565 to 1625 nanometers, placing the signal light $\lambda_S$ in the L band.

A first optical isolator 610 is optically disposed in the signal line 602 between the input $P_{in}$ and the output $P_{out}$. The first optical isolator 610 prevents backscattered light and other optical noise from traveling backward along the signal line 602, from the first optical isolator 610 toward the input $P_{in}$. A Bragg grating 620 is disposed along the signal line 602 optically downstream of the first optical isolator 610. Preferably, the Bragg grating is a fiber Bragg grating, although the Bragg grating can be other types of reflective elements, including, but not limited to, waveguide Bragg gratings.

A pump-signal multiplexer 630 is disposed along the signal line 602 optically downstream of the Bragg grating 620. The pump-signal multiplexer 630 couples a first end of a pump laser guide 632 to the signal line 602. A second end of the pump laser guide 632 is connected to a pump laser 634. Preferably, the pump laser 634 is a 980 nanometer laser which emits a pump signal $\lambda_P$, although those skilled in the art will recognize that other wavelengths can be used as well. Also preferably, the pump laser 634 has an output power of at least 100 mW, although those skilled in the art will recognize that the pump laser 634 can have other output powers as well.

A rare earth doped amplifying gain medium 640 is disposed along the signal line 602 optically downstream of the pump-signal multiplexer 630. A second optical isolator 650 is disposed along the signal line 602 optically downstream of the amplifying gain medium 640. The second optical isolator 650 prevents backscattered light and other optical noise from traveling backward along the signal line 602, from the second optical isolator 650 toward the amplifying gain portion 640. The second optical isolator 650 is optically connected to the output $P_{out}$ of the amplifier 600.

In operation, the signal light $\lambda_S$ having a wavelength band of approximately between 1565 and 1625 nanometers is injected into the amplifier 600 in a first direction at the input $P_{in}$. The signal light $\lambda_S$ is transmitted along the signal line 602 to the first optical isolator 610. The signal light $\lambda_S$ passes through the first optical isolator 610 and along the signal line 602 to the Bragg grating 620. The signal light $\lambda_S$ passes through the Bragg grating 620 to the pump-signal multiplexer 630.

The pump laser 634 transmits a 980 nanometer pump signal $\lambda_P$ along the pump laser guide 632 to the pump-signal multiplexer 630. At the pump-signal multiplexer 630, the signal light $\lambda_S$ is combined with the pump signal $\lambda_P$ emitted by the pump laser 634. The combined signal light $\lambda_S$ and the pump signal $\lambda_P$ are transmitted to the amplifying gain medium 640. The pump signal $\lambda_P$ excites the rare earth element in the amplifying gain medium 640, amplifying the signal light $\lambda_S$.

However, as the signal light $\lambda_S$ is transmitted through the amplifying gain medium 640, ASE, which travels in both forward and backward directions relative to the signal light $\lambda_S$, is generated. Only backward ASE will be discussed. The ASE travels in a second, opposite direction from the signal light $\lambda_S$, toward the input $P_{in}$. The ASE travels through the pump-signal multiplexer 630 and to the Bragg grating 620.

The Bragg grating 620 reflects the ASE in a narrow band of approximately 0.3 to 4 nm between approximately 1525 and 1560 nm. Remaining ASE is allowed to travel backward toward the first optical isolator 610. Although the narrow band of 0.3 to 4 nm is preferred, those skilled in the art will recognize that a wider band can be reflected.

The reflected ASE combines with the signal light $\lambda_S$ at the Bragg grating 620 and is transmitted toward the pump-signal multiplexer 630. At the pump-signal multiplexer 630, the ASE and the light signal $\lambda_S$ combine with the pump signal $\lambda_P$. The reflected ASE acts as a C band pump seed to suppress the backward ASE. The reflected ASE absorbs much of the pump signal $\lambda_P$ from the pump laser 634, thus preventing the backward ASE from absorbing as much pump signal $\lambda_P$ from the pump laser 634. The reflected ASE is amplified by the gain medium 640, which is first pumped by the pump laser 634. The amplified ASE then serves as a pump for the light signal $\lambda_S$. The reflected ASE then imparts a substantial portion of its energy to the signal light $\lambda_S$ in the amplifying gain medium 640. After amplification by the pump laser 634 and the reflected ASE, the signal light $\lambda_S$ has an amplified intensity, larger than the initial intensity. The amplified signal light $\lambda_S$ is then transmitted from the amplifying gain medium 640, through the second optical isolator 650, and to the output $P_{out}$.

Figure 6B:
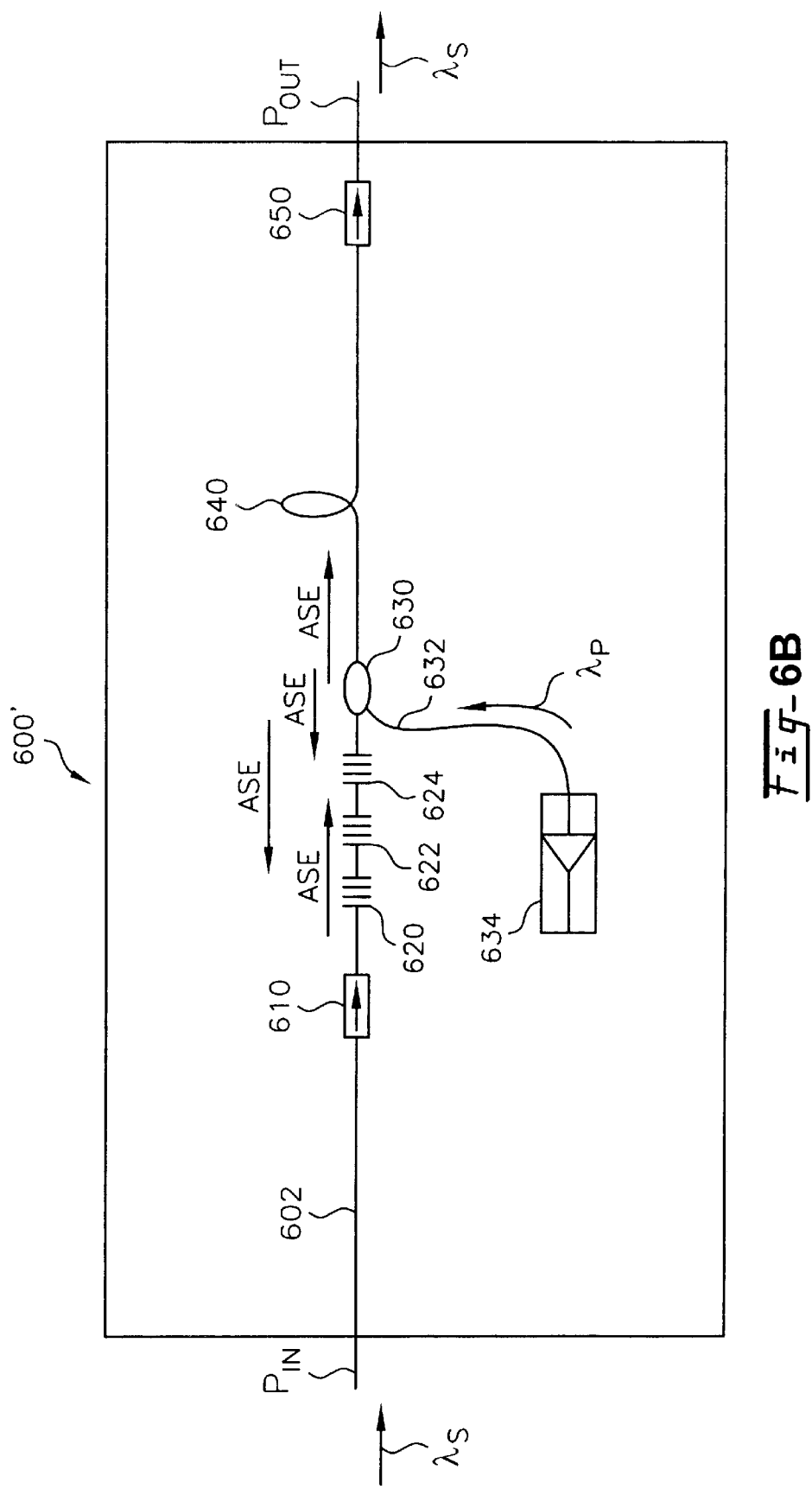
FIG. 6B is a schematic drawing of an L band amplifier according to a second version of the sixth embodiment of the present invention.

A second version of the sixth embodiment of the L band amplifier 600' is shown schematically in FIG. 6B. The amplifier 600' is similar to the amplifier 600 as described above, but instead of one Bragg grating 620 optically disposed between the first optical isolator 610 and the pump-signal multiplexer 630, a plurality of Bragg gratings 620, 622, 624 are optically disposed between the first optical isolator 610 and the pump-signal multiplexer 630. Each Bragg grating 620, 622, 624 is tuned to reflect different wavelength bands, resulting in increased reflected ASE at the reflected wavelengths. The reflected ASE acts as a C band pump seed to suppress the backward ASE. The reflected ASE absorbs much of the pump signal $\lambda_P$ from the pump laser 634, thus preventing the backward ASE from absorbing as much pump signal $\lambda_P$ from the pump laser 634. The reflected ASE is amplified in the amplifying gain medium 640 and then serves as a pump for the light signal $\lambda_S$. The reflected ASE then imparts a substantial portion of its energy to the signal light $\lambda_S$ in the amplifying gain medium 640. Although three Bragg gratings 620, 622, and 624 are shown, those skilled in the art will recognize that more or less than three Bragg gratings can be used.

Figure 6C:
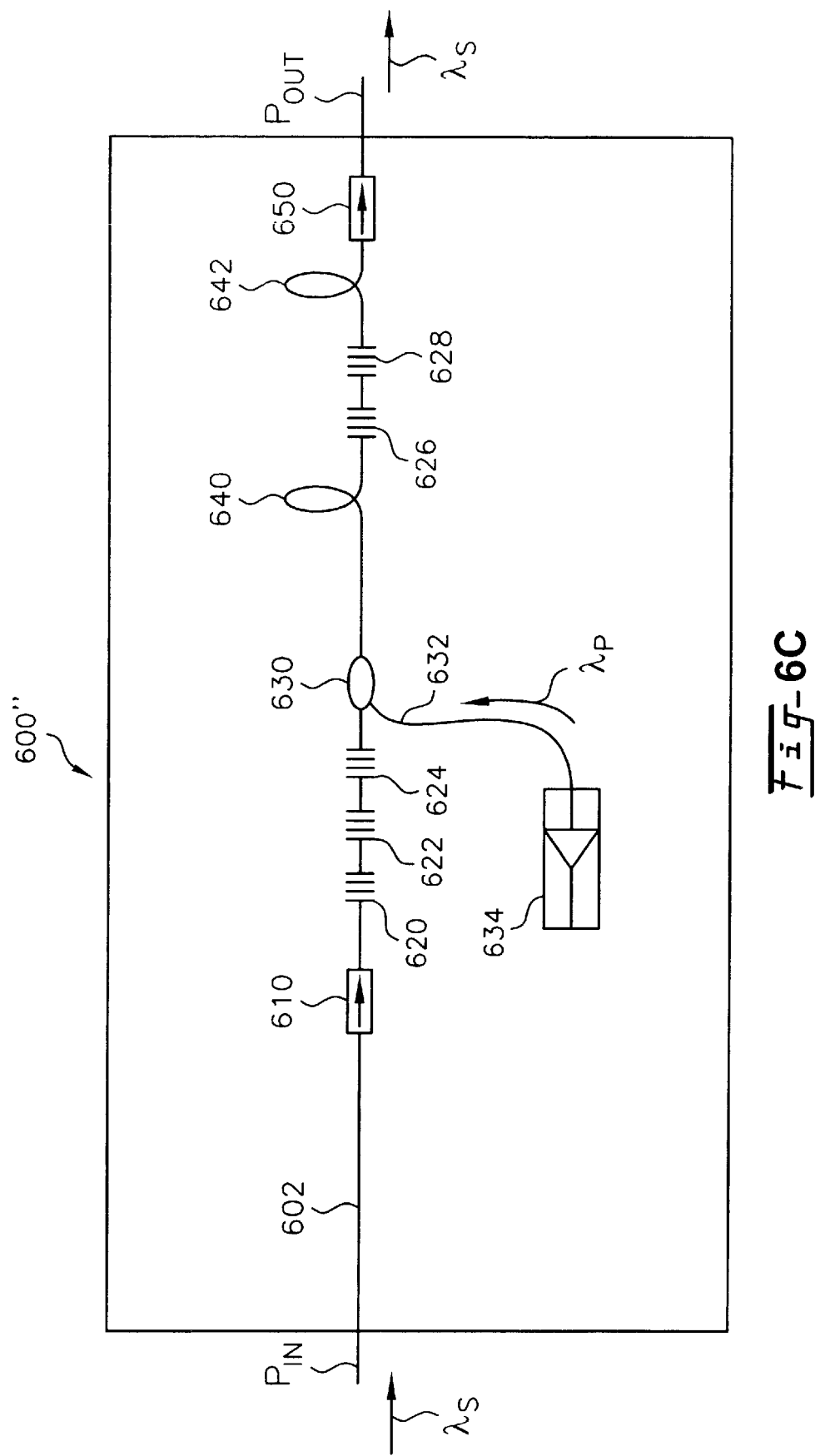
FIG. 6C is a schematic drawing of an L band amplifier according to a third version of the sixth embodiment of the present invention.

A third version of the sixth embodiment of the L band amplifier 600" is shown schematically in FIG. 6C. The amplifier 600" is similar to the amplifier 600' as described above, but in addition to the Bragg gratings 620, 622, and 624 which are optically disposed upstream of the gain medium 640, additional Bragg gratings 626, 628 are optically disposed downstream of the amplifying gain medium 640, with a second amplifying gain medium 642 optically disposed between the Bragg gratings 626, 628 and the second optical isolator 650. However, those skilled in the art will recognize that the Bragg gratings 626, 628 can be optically disposed along the signal line 602 anywhere between the Bragg grating 624 and the second optical isolator 650.

In operation, the signal light $\lambda_S$ having a wavelength band of approximately between 1565 and 1625 nanometers is injected into the amplifier 600 in a first direction at the input $P_{in}$. The signal light $\lambda_S$ is transmitted along the signal line 602 to the first optical isolator 610. The signal light $\lambda_S$ passes through the first optical isolator 610 and along the signal line 602 to the Bragg gratings 620, 622, 624. The signal light $\lambda_S$ passes through the Bragg gratings 620, 622, 624 to the pump-signal multiplexer 630.

The pump laser 634 transmits a 980 nanometer pump signal $\lambda_P$ along the pump laser guide 632 to the pump-signal multiplexer 630. At the pump-signal multiplexer 630, the signal light $\lambda_S$ is combined with the pump signal $\lambda_P$ emitted by the pump laser 634. The combined signal light $\lambda_S$ and the pump signal $\lambda_P$ are transmitted to the amplifying gain medium 640. The pump signal $\lambda_P$ excites the rare earth element in the amplifying gain medium 640, amplifying the signal light $\lambda_S$.

However, as the signal light $\lambda_S$ is transmitted through the amplifying gain medium 640, ASE, which travels in both forward and backward directions relative to the signal light $\lambda_S$, is generated. Only backward ASE will be discussed. The ASE travels in a second, opposite direction from the signal light $\lambda_S$, toward the input $P_{in}$. The ASE travels through the pump-signal multiplexer 630 and to the Bragg gratings 620, 622, 624. Preferably, the Bragg gratings are selected to reflect ASE in the range of approximately 1535 to 1560 nm, so that ASE of the selected wavelengths is reflected back into the amplifying gain medium 640 as seed to amplify the signal light $\lambda_S$ between approximately 1565 nm and 1580 nm.

As the signal light $\lambda_S$ and any remaining pump light $\lambda_P$ is further transmitted along the signal line 602, the signal light $\lambda_S$ and the pump light $\lambda_P$ pass through the Bragg gratings 626, 628 to the second amplifying gain medium 642, where the pump light $\lambda_P$ excites rare earth element in the second amplifying gain medium 642, amplifying the signal light $\lambda_S$.

However, as the signal light $\lambda_S$ is transmitted through the second amplifying gain medium 642, additional backward ASE is generated. The ASE travels in a second, opposite direction from the signal light $\lambda_S$, toward the input $P_{in}$. The ASE travels to the Bragg gratings 626, 628. Preferably, the Bragg gratings are selected to reflect ASE in the range of approximately 1560 to 1580 nm, so that ASE of the selected wavelengths is reflected back into the second amplifying gain medium 642 as seed to amplify the signal light $\lambda_S$ between approximately 1580 nm and 1625 nm.

As is known by those skilled in the art, longer lengths of the amplifying gain media 640, 642 provide for higher emissions at longer wavelengths. The first amplifying gain medium 640 amplifies the signal light $\lambda_S$ in a shorter L band region of approximately between 1565 and 1580 nm, while the second amplifying gain medium 642 amplifies the signal light $\lambda_S$ in a longer L band region of approximately between 1560 and 1580 nm. Preferably, the lengths of each of the amplifying gain media 640, 642 are each approximately 80 to 100 meters. However, higher rare earth concentrations in the amplifying gain media 640, 642 will allow comparable amplification of the light signal at shorter lengths, such as approximately 60 meters each. If desired, the lengths of each of the amplifying gain media 640, 642 can be optimized to provide maximum amplification within predetermined bandwidths. For such an arrangement, it is possible that the length of the amplifying gain medium 640 can be zero; in other words, the amplifying gain medium 640 can be omitted and the second amplifying gain medium 642 can be the only amplifying gain medium in the amplifier 600".

Also, referring to FIGS. 6A, 6B, and 6C, although the Bragg gratings 620, 622, and 624 are optically disposed between the first optical isolator 610 and the pump-signal multiplexer 630, those skilled in the art will recognize that the Bragg gratings 620, 622, and 624 can be optically disposed between the first optical isolator 610 and the second optical isolator 650.

Figure 7A:
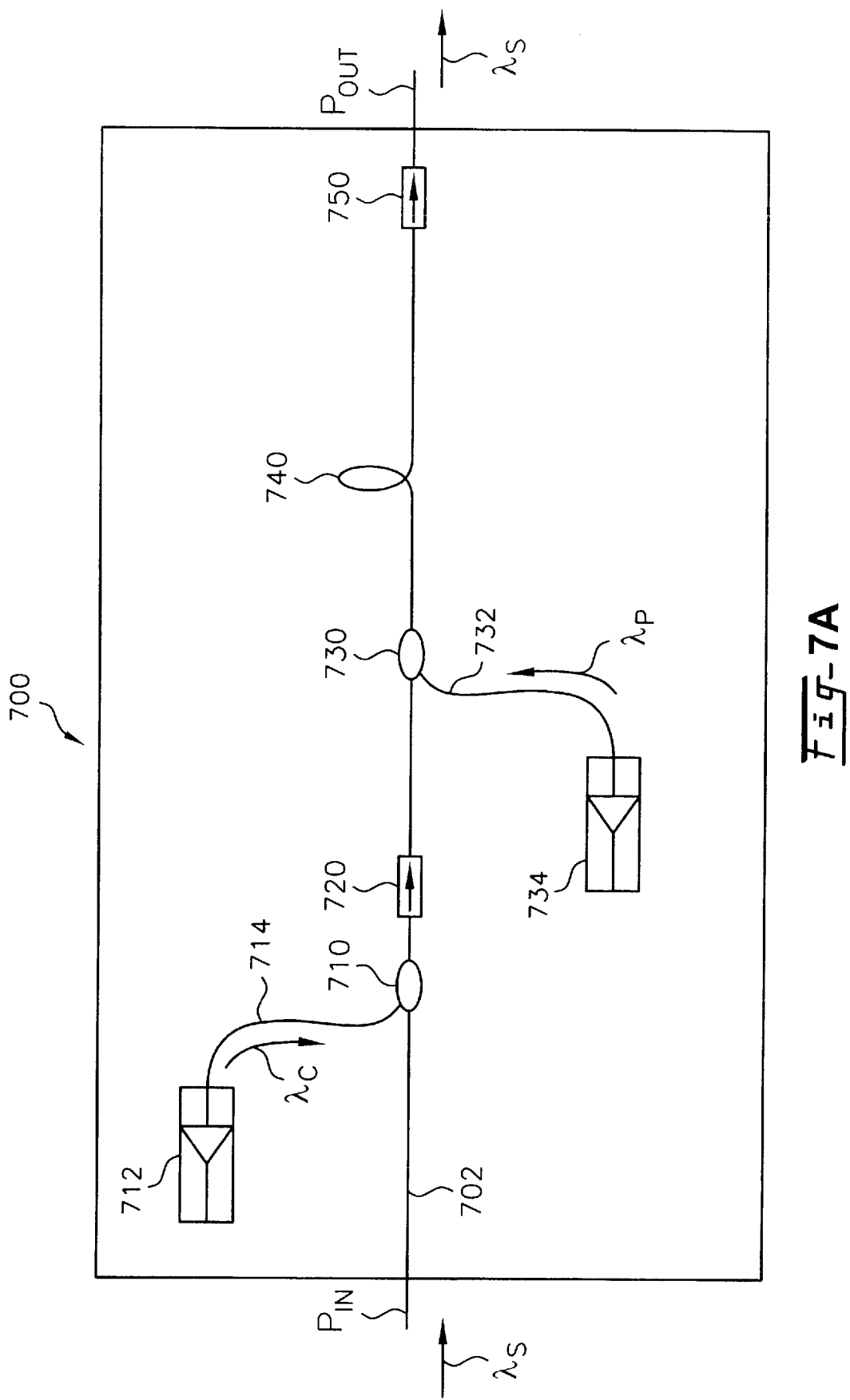
FIG. 7A is a schematic drawing of an L band amplifier according to a first version of a seventh embodiment of the present invention.

A first version of a seventh embodiment of an L band amplifier 700 according to the present invention is shown schematically in FIG. 7A. The amplifier 700 includes a signal line 702 which extends from an input $P_{in}$ at one end of the amplifier 700 to an output $P_{out}$ at another end of the amplifier 700. The input $P_{in}$ and the output $P_{out}$ are optically connected to each other along the signal line 702 through the amplifier 700. Signal light $\lambda_S$ having at least one, and preferably, multiple wavelengths is transmitted through the amplifier 700 from the input $P_{in}$ to the output $P_{out}$, from left to right as shown in FIG. 7A. The wavelengths of the signal light $\lambda_S$ preferably range approximately from 1565 to 1625 nanometers, placing the signal light $\lambda_S$ in the L band.

A C-L band multiplexer 710 is optically disposed in the signal line 702 between the input $P_{in}$ and the output $P_{out}$. The C-L band multiplexer 710 optically connects a tunable C band seed pump 712 to the signal line 702 via a C band pump guide 714. Alternatively, an optical coupler (not shown) can be used instead of the C-L band multiplexer 710. A first optical isolator 720 is disposed in the signal line 702 optically downstream of the C-L band multiplexer 710. The first optical isolator 720 prevents backscattered light and other optical noise from traveling backward along the signal line 702, from the first optical isolator 710 toward the input $P_{in}$.

A pump-signal multiplexer 730 is disposed along the signal line 702 optically downstream of the first optical isolator 720. The pump-signal multiplexer 730 couples a first end of a pump laser guide 732 to the signal line 702. A second end of the pump laser guide 732 is connected to a pump laser 734. Preferably, the pump laser 734 is a 980 nanometer laser which emits a pump signal $\lambda_P$, although those skilled in the art will recognize that other wavelengths can be used as well. Also preferably, the pump laser 734 has an output power of at least 100 mW, although those skilled in the art will recognize that the pump laser 734 can have other output powers as well.

A rare earth doped amplifying gain medium 740 is disposed along the signal line 702 optically downstream of the pump-signal multiplexer 730. A second optical isolator 750 is disposed along the signal line 702 optically downstream of the amplifying gain medium 740. The second optical isolator 750 prevents backscattered light and other optical noise from traveling backward along the signal line 702, from the second optical isolator 750 toward the amplifying gain portion 740. The second optical isolator 750 is optically connected to the output $P_{out}$ of the amplifier 700.

In operation, the signal light $\lambda_S$ having a wavelength band of approximately between 1565 and 1625 nanometers is injected into the amplifier 700 in a first direction at the input $P_{in}$. The signal light $\lambda_S$ is transmitted along the signal line 702 to C-L band multiplexer 710. The signal light $\lambda_S$ passes through the C-L band multiplexer 710 and along the signal line 702 to the first optical isolator 720. The signal light $\lambda_S$ passes through the first optical isolator 720 to the pump-signal multiplexer 730.

The C band seed pump 712 generates a tunable C band light signal $\lambda_C$, between 1530 nm and 1570 nm. The C band seed pump 712 can be tuned to generate an optimized C band seed wavelength for transmission toward the amplifying gain medium 740. The C band light signal $\lambda_S$ travels along the C band pump guide 714 to the C-L band multiplexer 720, where the C band light signal $\lambda_S$ enters the signal line 702. The C band light signal $\lambda_S$ then travels along the signal line 702 with the signal light $\lambda_S$.

The pump laser 734 transmits a 980 nanometer pump signal $\lambda_P$ along the pump laser guide 732 to the pump-signal multiplexer 730. At the pump-signal multiplexer 730, the signal light $\lambda_S$ and the C band light signal $\lambda_C$ are combined with the pump signal $\lambda_P$ emitted by the pump laser 734. The C band light signal $\lambda_C$ is amplified in the gain medium 740 and suppresses the backward ASE. The amplified C band light signal $\lambda_C$, as well as the signal light $\lambda_S$ and the pump signal $\lambda_P$, propagate through the amplifying gain medium 740. The amplified C band light signal $\lambda_C$ and any residual pump signal $\lambda_P$ excite the rare earth element in the amplifying gain medium 740, amplifying the signal light $\lambda_S$. The C band light signal $\lambda_C$ does not significantly generate ASE in the C band because of the longer wavelength of the C band light signal $\lambda_C$. As a result, backward ASE is significantly reduced and additional C band pumping by the C band seed is generated, resulting in greater amplification of the signal light $\lambda_S$.

Figure 7B:
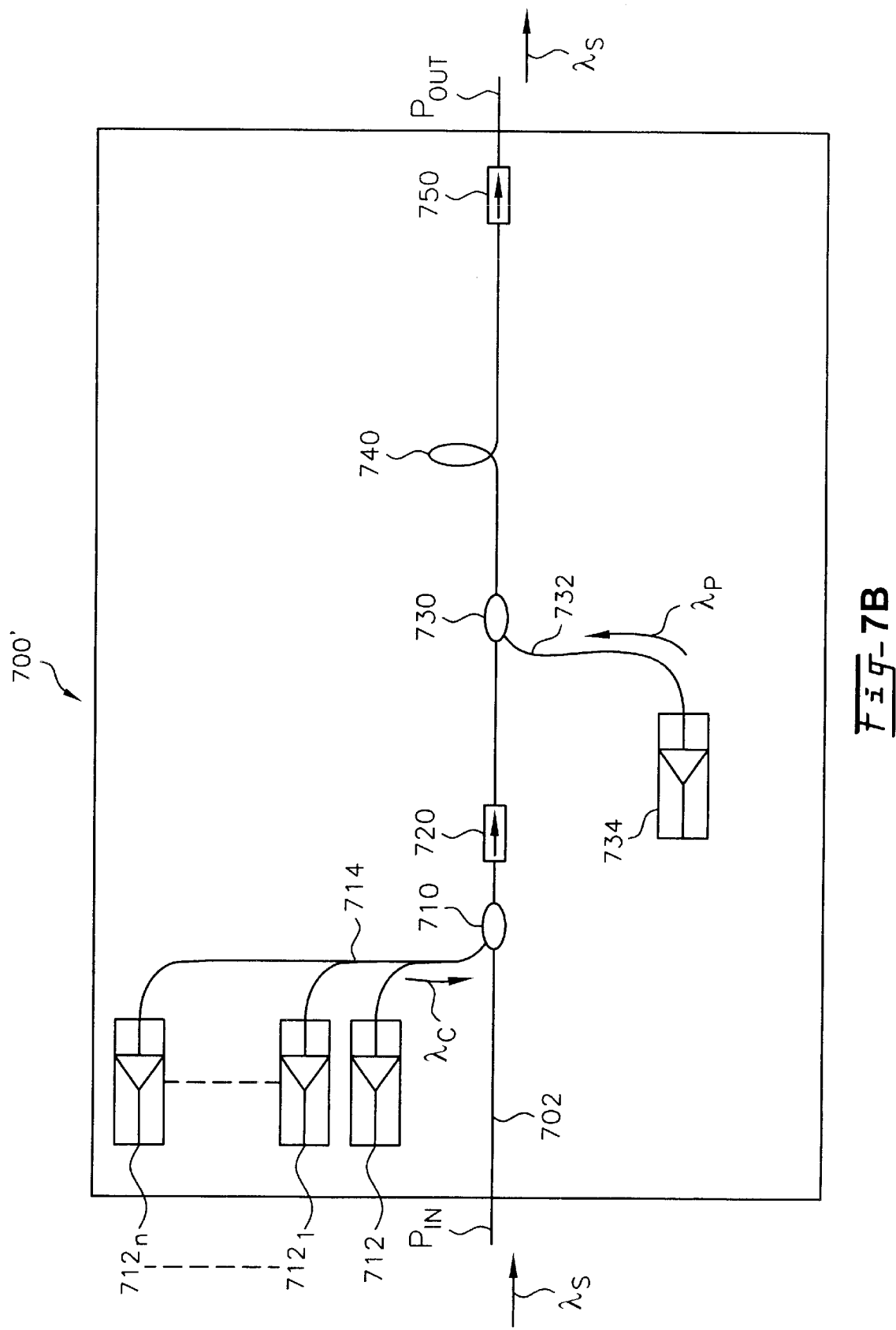
FIG. 7B is a schematic drawing of an L band amplifier according to a second version of the seventh embodiment of the present invention.

A second version of the seventh embodiment of the L band amplifier 700' is shown schematically in FIG. 7B. The second version is similar to the first version shown in FIG. 7A, but with additional C band seed pumps 712$_1$ through 712$_n$ optically connected to the signal line 702. Each C band seed pump 712, 712a through 712$_1$ generate C band seed at a separate wavelength within the C band. The multiple wavelengths of C band seed provide additional amplification of the signal light $\lambda_S$ over the C band seed provided by the single C band seed pump 712.

Figure 8:
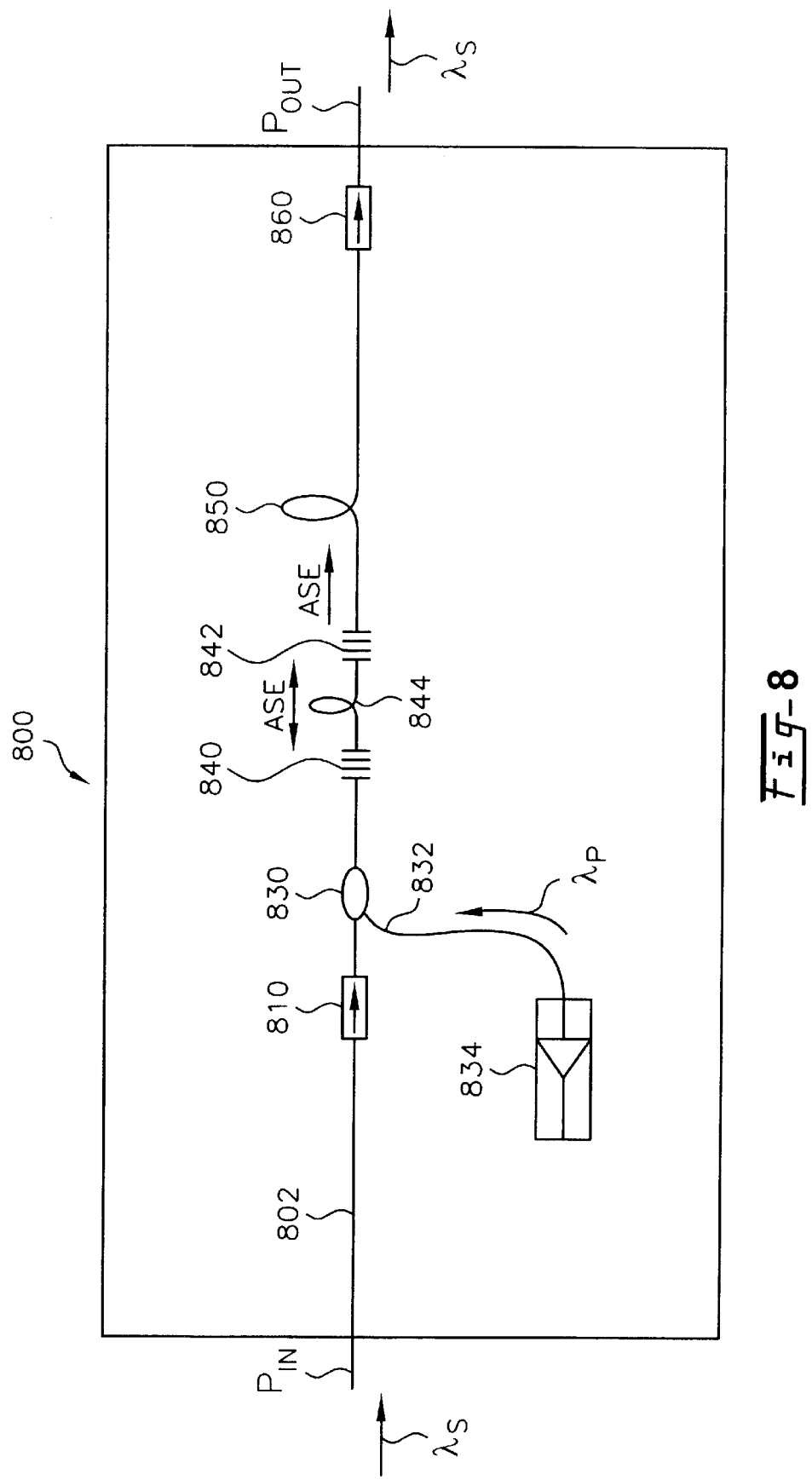
FIG. 8 a schematic drawing of an L band amplifier according to an eighth embodiment of the present invention.

An eighth embodiment of an L band amplifier 800 according to the present invention is shown schematically in FIG. 8. The amplifier 800 includes a signal line 802 which extends from an input $P_{in}$ at one end of the amplifier 800 to an output $P_{out}$ at another end of the amplifier 800. The input $P_{in}$ and the output $P_{out}$ are optically connected to each other along the signal line 802 through the amplifier 800. Signal light $\lambda_S$ having at least one, and preferably, multiple wavelengths is transmitted through the amplifier 800 from the input $P_{in}$ to the output $P_{out}$, from left to right as shown in FIG. 8. The wavelengths of the signal light $\lambda_S$ preferably range approximately from 1565 to 1625 nanometers, placing the signal light $\lambda_S$ in the L band.

A first optical isolator 810 is optically disposed in the signal line 802 between the input $P_{in}$ and the output $P_{out}$. The first optical isolator 810 prevents backscattered light and other optical noise from traveling backward along the signal line 802, from the first optical isolator 810 toward the input $P_{in}$.

A pump-signal multiplexer 830 is disposed along the signal line 802 optically downstream of the first optical isolator 810. The pump-signal multiplexer 830 couples a first end of a pump laser guide 832 to the signal line 802. A second end of the pump laser guide 832 is connected to a pump laser 834. Preferably, the pump laser 834 is a 980 nanometer laser which emits a pump signal $\lambda_P$, although those skilled in the art will recognize that other wavelengths can be used as well. Also preferably, the pump laser 834 has an output power of at least 100 mW, although those skilled in the art will recognize that the pump laser 834 can have other output powers as well.

First and second Bragg gratings 840, 842 are disposed in the signal line 802 optically downstream of the pump-signal multiplexer 830. A lasing medium 844 is optically disposed between the first and second Bragg gratings 840, 842. Preferably, the lasing medium 844 is a rare earth doped fiber, although those skilled in the art will recognize that other lasing media can be used. The Bragg gratings 840, 842 preferably reflect the same wavelength of light, but with different percentages of reflectability. Preferably, the first Bragg grating 840 reflects more light than the second Bragg grating 842.

A rare earth doped amplifying gain medium 850 is disposed along the signal line 802 optically downstream of the second Bragg grating 842. A second optical isolator 860 is disposed along the signal line 802 optically downstream of the amplifying gain medium 850. The second optical isolator 860 prevents backscattered light and other optical noise from traveling backward along the signal line 802, from the second optical isolator 860 toward the amplifying gain portion 850. The second optical isolator 860 is optically connected to the output $P_{out}$ of the amplifier 800.

In operation, the signal light $\lambda_S$ having a wavelength band of approximately between 1565 and 1625 nanometers is injected into the amplifier 800 in a first direction at the input $P_{in}$. The signal light $\lambda_S$ is transmitted along the signal line 802 to the first optical isolator 810. The signal light $\lambda_S$ passes through the first optical isolator 810 and along the signal line 802 to the pump-signal multiplexer 830.

The pump laser 834 transmits a 980 nanometer pump signal $\lambda_P$ along the pump laser guide 832 to the pump-signal multiplexer 830. At the pump-signal multiplexer 830, the signal light $\lambda_S$ is combined with the pump signal $\lambda_P$ emitted by the pump laser 834. The combined signal light $\lambda_S$ and the pump signal $\lambda_P$ are transmitted through the first and second Bragg gratings 840, 842 and the lasing medium 844 to the amplifying gain medium 850. The pump signal $\lambda_P$ excites the rare earth element in the amplifying gain medium 850, amplifying the signal light $\lambda_S$.

However, as the signal light $\lambda_S$ is transmitted through the amplifying gain medium 850, C band ASE, which travels in both forward and backward directions relative to the signal light $\lambda_S$, is generated. Only backward ASE will be discussed. The ASE travels in a second, opposite direction from the signal light $\lambda_S$, toward the input $P_{in}$. The ASE travels through the second Bragg grating 842 and the lasing medium 844 to the first Bragg grating 840. The ASE stimulates the rare earth ions in the lasing medium 844, which in turn amplify the signal light $\lambda_S$, as described above in previous embodiments of the present invention.

The first Bragg grating 840 reflects preferably approximately 99% of the ASE in a narrow band of preferably approximately 1 nm between approximately 1525 and 1560 nm. Remaining ASE is allowed to travel backward toward the first optical isolator 810. Although the narrow band of approximately 1 nm is preferred, those skilled in the art will recognize that a wider band can be used. The reflected ASE travels back through the lasing medium 844, further stimulating the rare earth ions in the lasing medium 844. Preferably approximately 80% of the reflected ASE is re-reflected by the second Bragg grating 842 back toward the lasing medium 844, setting up a lasing effect, with a substantial portion of the ASE being reflected between the first and second Bragg gratings 840, 842.

The lasing medium 844 provides relatively high power (preferably up to between 6 and 8 mW) seed signal to the amplifier gain medium 850 to suppress the backward ASE and to serve as a secondary pump for the amplifier 800. The amplified signal light $\lambda_S$ is then transmitted from the amplifying gain medium 850, through the second optical isolator 860, and to the output $P_{out}$.

Although the embodiments described above are generally referred to as having several individual components, those skilled in the art will recognize that components such as amplifying media, optical isolators, multiplexers, Bragg gratings, bypass guides, and ASE guides can be incorporated into a single or several planar waveguides.

Figure 9:
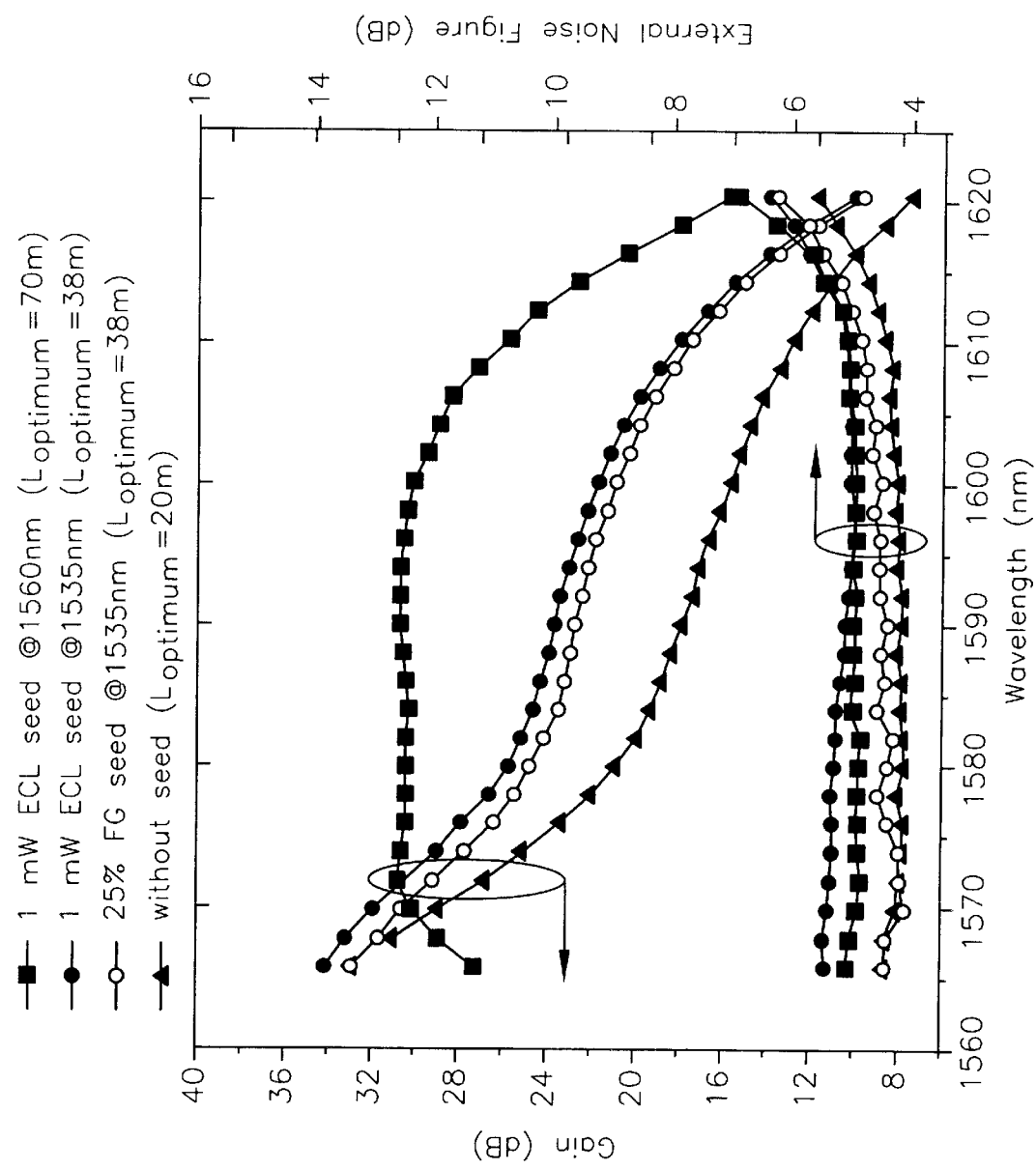
FIG. 9 is a graph showing measured gain and noise figures vs. input signal wavelength for the sixth and seventh embodiments of the present invention.

The top two curves on the graph of FIG. 9 (solid square and solid circle) show measured gain vs. input signal wavelength for the seventh embodiment of the present invention. The third curve (open circle) shows measured gain vs. input signal wavelength for the sixth embodiment of the present invention having only one Bragg grating 620, with the Bragg grating 620 reflecting approximately 25% of the ASE. The fourth curve (solid triangle) shows measured gain vs. input signal wavelength without any seed. The pump laser 634 used was a 980 nm pump, operating at approximately 180 mW.

Figure 10:
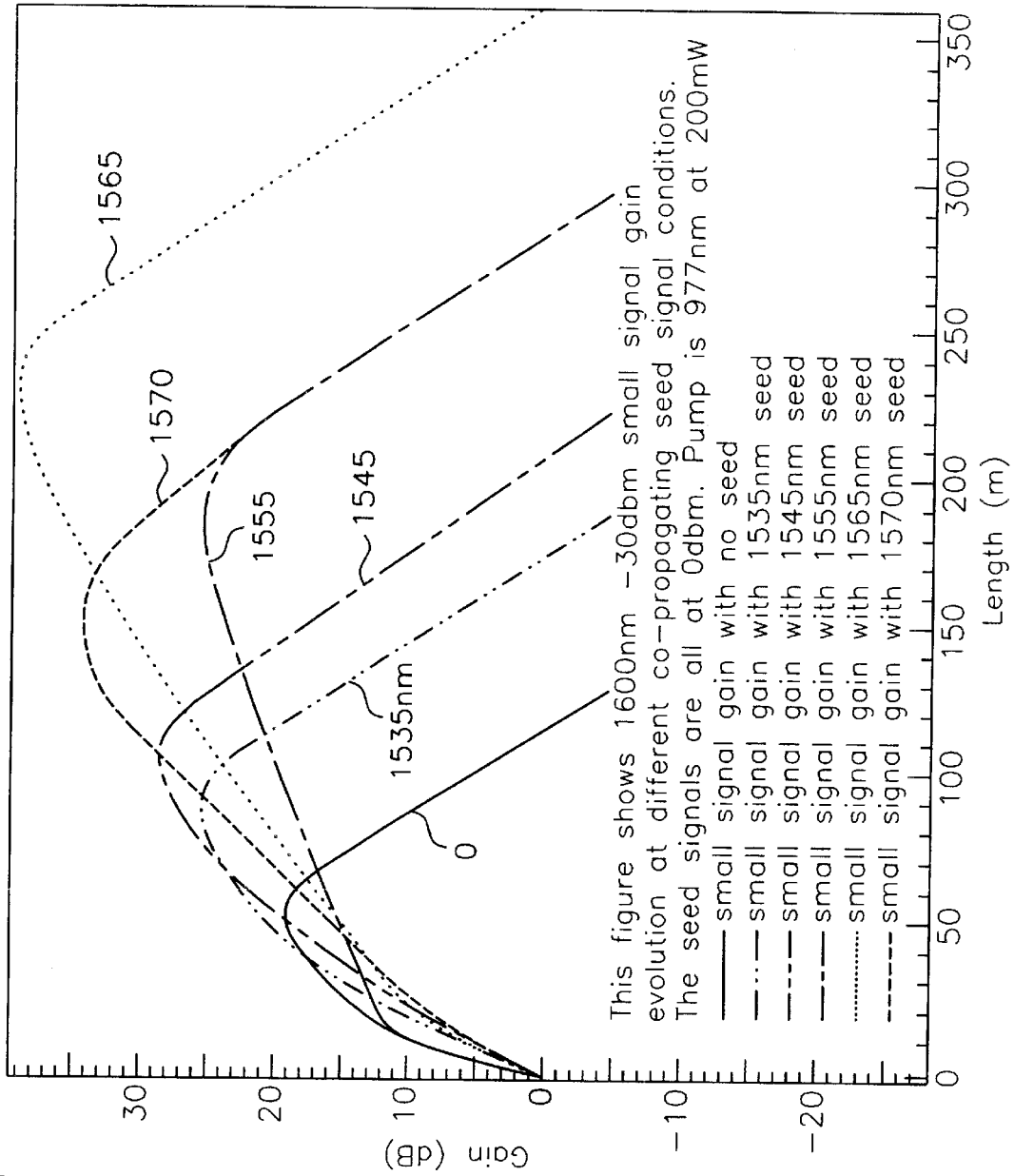
FIG. 10 is a graph showing calculated gain at 1600 nm vs. amplifying medium length at various wavelengths of a seed signal at 0 dBm for the eighth embodiment of the present invention.
Figure 11:
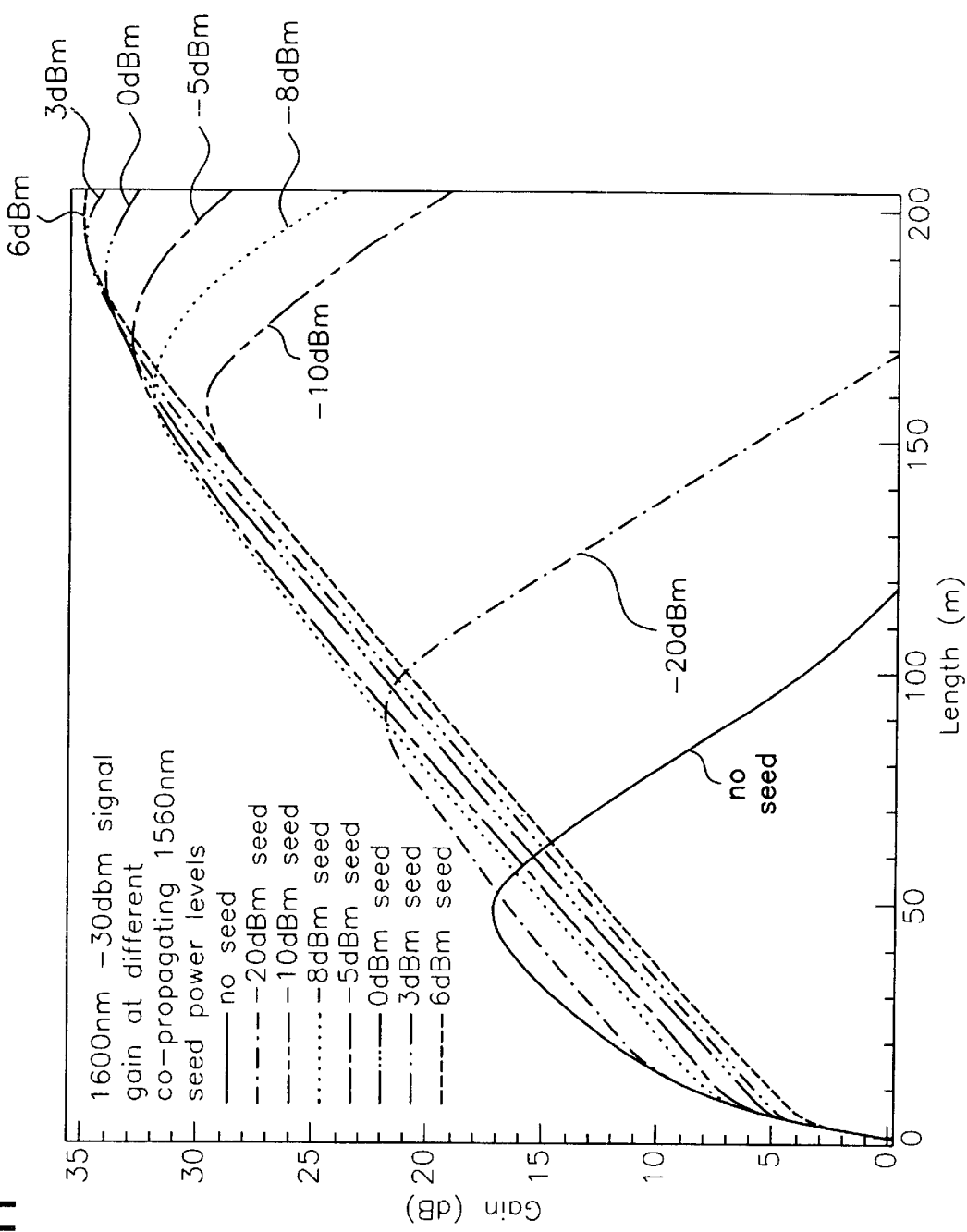
FIG. 11 is a graph showing calculated gain vs. amplifying medium length at various seed powers at 1560 nm for a 1600 nm −30 dBm signal for the seventh embodiment of the present invention.
Figure 12:
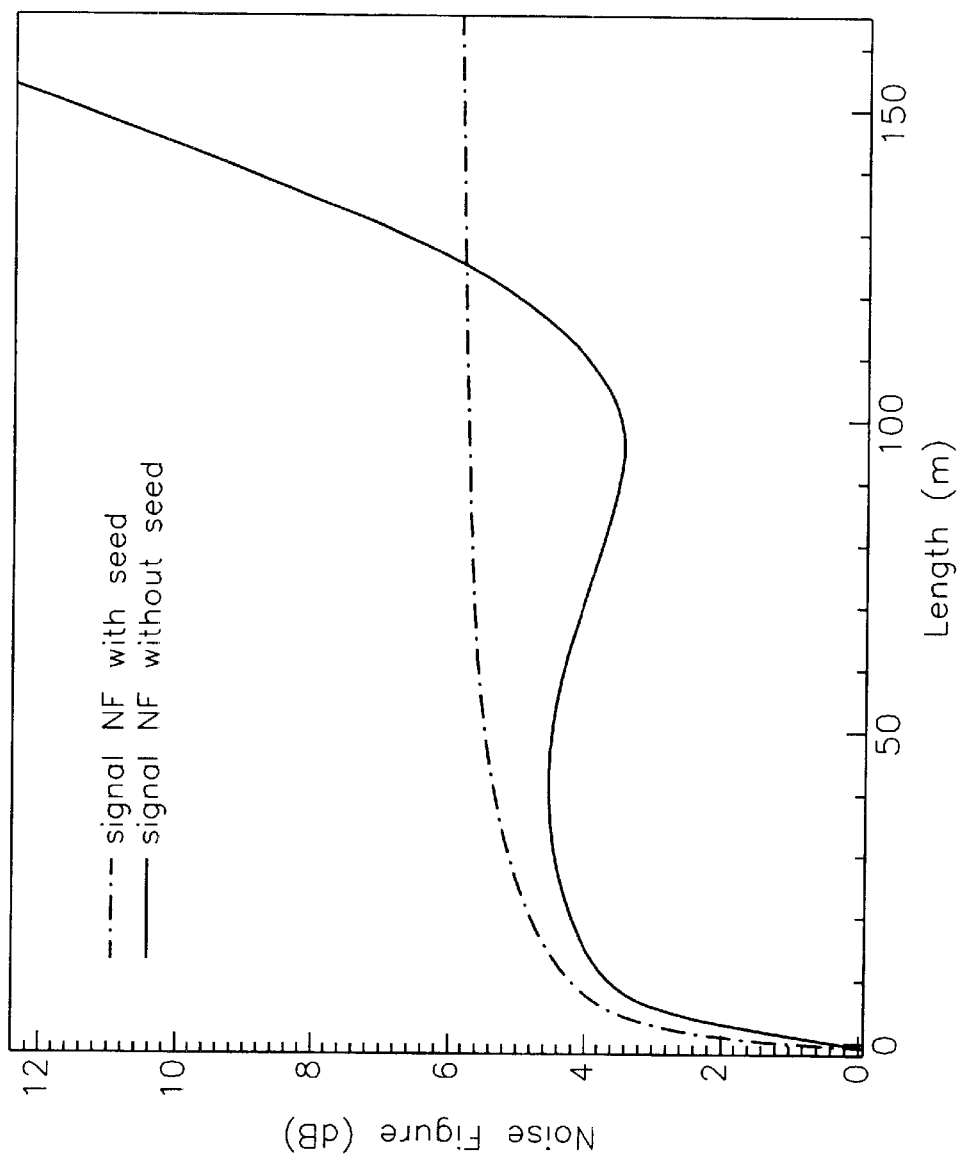
FIG. 12 is a graph showing calculated noise figure vs. amplifying medium length for a signal with and without seed for the eighth embodiment of the present invention.

FIG. 10 shows calculated gain vs. amplifying medium length at various wavelengths of a seed signal at 0 dBm. FIG. 11 shows calculated gain vs. amplifying medium length at various 1560 nm seed powers for a 1600 nm, −30 dBm signal. FIG. 12 shows calculated noise figure vs. amplifying medium length for a signal with and without seed. The calculations were performed using OPTIWAVE® software. The calculations show significant gain with relatively low noise figures at particular lengths of the amplifying gain medium 850 for various seed wavelengths and various seed powers. The seed is generated according to known methods, but preferably using Bragg gratings as shown in the sixth embodiment or using a seed laser as shown in the seventh embodiment or building a Bragg grating laser optically upstream of the amplifier gain medium as shown in the eighth embodiment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An L band optical amplifier comprising:
   a signal line for transmitting a signal light in a first direction, the signal line including:
   an input;
   an output disposed optically downstream of the input; and
   an amplifying gain medium optically disposed between the input and the output;
   a laser optically connected to the signal line between the input and the amplifying gain medium; and
   a first wavelength division multiplexer optically disposed between the input and the amplifying gain medium, wherein the wavelength division multiplexer removes C band light generated in the amplifying gain medium in a second direction, opposite the first direction, from the signal line.

2. The L band optical amplifier according to claim 1, wherein the C band light is amplified spontaneous emission.

3. The L band amplifier according to claim 2, further comprising an amplified spontaneous emission guide having a first end optically connected to the first wavelength division multiplexer and a second end optically connected to a reflector.

4. The L band optical amplifier according to claim 2, wherein the amplifying gain medium comprises a first amplifying portion and a second amplifying portion.

5. The L band optical amplifier according to claim 4, further comprising a second wavelength division multiplexer optically disposed between the first amplifying gain portion and the second amplifying gain portion and an amplified spontaneous emission guide having a first end optically connected to the first wavelength division multiplexer and a second end optically connected to the second wavelength division multiplexer.

6. The L band optical amplifier according to claim 5, further comprising a bypass guide optically connecting the first amplifying gain portion and the second amplifying gain portion, the bypass guide optically bypassing the second end of the amplified spontaneous emission guide.

7. The L band optical amplifier according to claim 5, further comprising an optical isolator optically disposed between the first and second amplifying gain portions and an isolator bypass optically connecting the first amplifying gain portion and the second amplifying gain portion, the isolator bypass optically bypassing the optical isolator, and wherein the means comprises an amplified spontaneous emission guide having a first end optically connected to the signal line between the input and the first amplifying gain portion and a second end optically connected to the signal line between the second amplifying gain portion and the output.

8. The L band optical amplifier according to claim 7, further comprising a reflecting filter optically disposed along the amplified spontaneous emission guide between the first and second ends.

9. The L band optical amplifier according to claim 2, wherein the signal line further comprises an optical isolator optically disposed between the input and the amplifying gain medium.

10. The L band optical amplifier according to claim 2, wherein the signal line further comprises an optical isolator optically disposed between the amplifying gain medium and the output.

11. The L band optical amplifier according to claim 2, wherein the means for directing amplified spontaneous emission increases signal gain by approximately 14 dB.

12. The L band optical amplifier according to claim 1, wherein the laser is a 980 nm laser.

13. The L band optical amplifier according to claim 8, wherein the reflecting filter reflects approximately 4 percent of light incident on the reflecting filter.

* * * * *

UNITED STATES PATENT AND TRADEMARK OFFICE
CERTIFICATE OF CORRECTION

PATENT NO.   : 6,507,430 B2
DATED        : June 25, 2001
INVENTOR(S)  : Aydin Yeniay It is certified that error appears in the above-identified patent and that said Letters Patent is hereby corrected as shown below:

<u>Title page,</u>
Item [73], should read -- Photon- X, Inc. --
Under Item [12] and in Item [75], should read -- Aydin Yeniay --

Signed and Sealed this

Twenty-seventh Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,507,430 B2                                   Page 1 of 1
DATED         : January 14, 2003
INVENTOR(S)   : Yenjay It is certified that error appears in the above-identified patent and that said Letters Patent is hereby corrected as shown below:

<u>Title page,</u>
Item [75], should read -- Yeniay --
Item [73], should read -- Photon-X, Inc. --

Signed and Sealed this

Twenty-second Day of July, 2003

JAMES E. ROGAN
*Director of the United States Patent and Trademark Office*